US012699846B2

(12) United States Patent
Venkateshwaran et al.

(10) Patent No.: US 12,699,846 B2
(45) Date of Patent: Aug. 4, 2026

(54) SYSTEMS AND METHODS FOR INSIGHTS EXTRACTION USING SEMANTIC SEARCH

(71) Applicant: Charlee.ai, Inc., Pleasanton, CA (US)

(72) Inventors: Ramaswamy Venkateshwaran, San Ramon, CA (US); John Standish, Menefee, CA (US)

(73) Assignee: Charlee.ai, Inc., Pleasanton, CA (US)

( * ) Notice: Subject to any disclaimer, the term of this patent is extended or adjusted under 35 U.S.C. 154(b) by 321 days.

(21) Appl. No.: 18/614,695

(22) Filed: Mar. 24, 2024

(65) Prior Publication Data

US 2024/0232539 A1 Jul. 11, 2024

Related U.S. Application Data

(63) Continuation-in-part of application No. 17/736,423, filed on May 4, 2022, now Pat. No. 12,493,747, which is a continuation-in-part of application No. 16/798,277, filed on Feb. 21, 2020, now Pat. No. 11,604,926.

(60) Provisional application No. 62/808,302, filed on Feb. 21, 2019.

(51) Int. Cl.
| | |
|---|---|
| *G06F 40/30* | (2020.01) |
| *G06F 16/2457* | (2019.01) |
| *G06F 40/205* | (2020.01) |
| *G06F 40/289* | (2020.01) |

(52) U.S. Cl.
CPC ........ *G06F 40/30* (2020.01); *G06F 16/24578* (2019.01); *G06F 40/205* (2020.01); *G06F 40/289* (2020.01)

(58) Field of Classification Search
CPC .. G06F 40/30; G06F 16/24578; G06F 40/205; G06F 40/289; G06F 40/131; G06F 40/216; G06F 40/247; G06F 16/367; G06N 3/044; G06N 3/092; G06N 20/10; G06Q 10/10; G06Q 40/08
USPC .......................................................... 704/9
See application file for complete search history.

(56) References Cited

U.S. PATENT DOCUMENTS 11,263,277 B1 * 3/2022 Podgorny ........... G06F 16/3329

* cited by examiner

*Primary Examiner* — Thierry L Pham
(74) *Attorney, Agent, or Firm* — Key Kesan Dallmann PLLC

(57) ABSTRACT

A method for extracting semantic hashtags representing topics in one or more domain-specific documents, each topic relevant to achieving a goal of a domain-specific entity includes a processor executing a routine to split a domain-specific document into data objects, the data objects comprising sentences and paragraphs, using grammar rules specific to the domain-specific entity; applying an unsupervised learning model to classify the data objects as noisy and non-noisy for the domain-specific entity; discarding the noisy data objects; applying a supervised learning model to identify, based on a pre-defined set of intents, an intent of each non-noisy data object; tagging each non-noisy data object with its intent; applying the intent to an ontology graph base to identify a corresponding semantic hashtag; annotating each non-noisy data object with its semantic hashtag; and using one or more annotated non-noisy data objects, generating, for the domain-specific entity, a recommended action for achieving the goal.

21 Claims, 26 Drawing Sheets

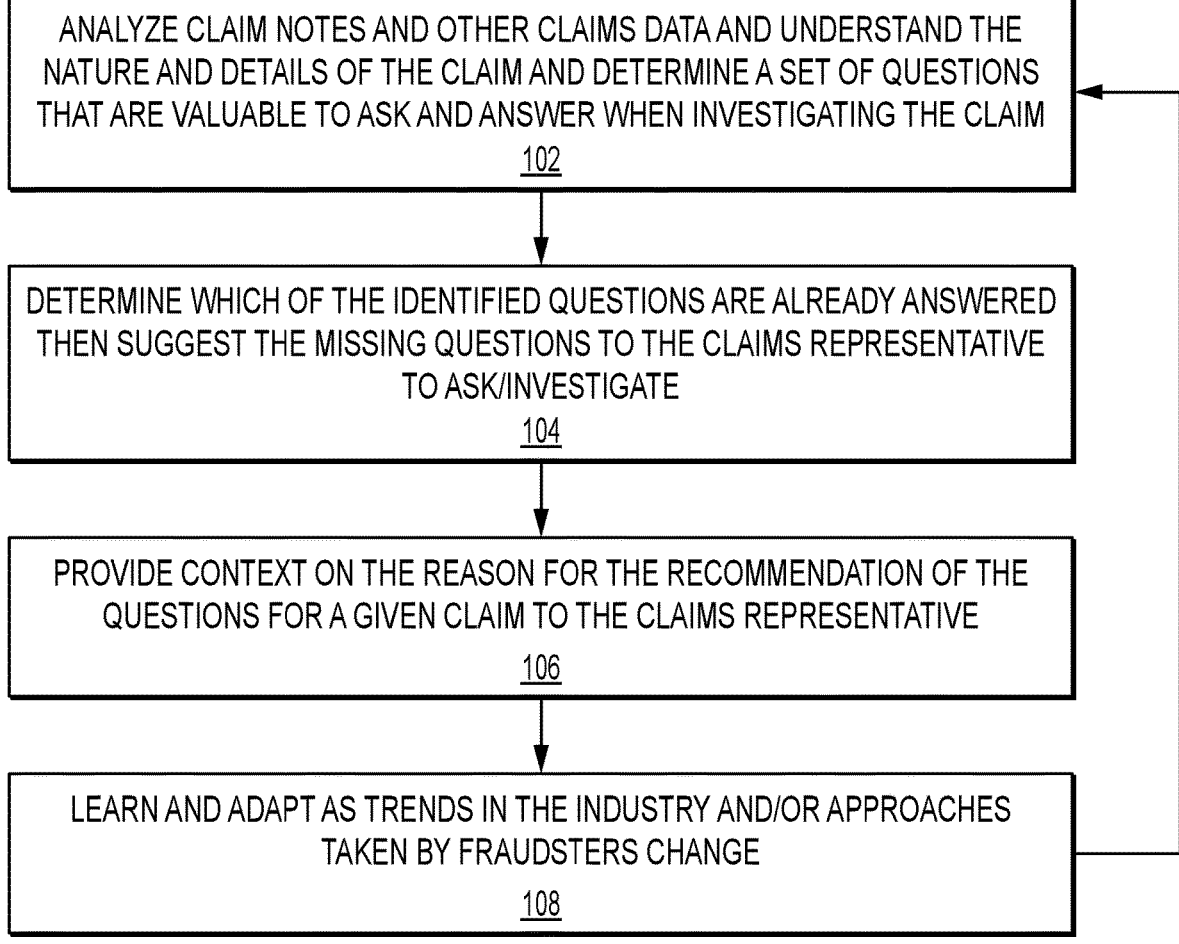

ANALYZE CLAIM NOTES AND OTHER CLAIMS DATA AND UNDERSTAND THE NATURE AND DETAILS OF THE CLAIM AND DETERMINE A SET OF QUESTIONS THAT ARE VALUABLE TO ASK AND ANSWER WHEN INVESTIGATING THE CLAIM
102

DETERMINE WHICH OF THE IDENTIFIED QUESTIONS ARE ALREADY ANSWERED THEN SUGGEST THE MISSING QUESTIONS TO THE CLAIMS REPRESENTATIVE TO ASK/INVESTIGATE
104

PROVIDE CONTEXT ON THE REASON FOR THE RECOMMENDATION OF THE QUESTIONS FOR A GIVEN CLAIM TO THE CLAIMS REPRESENTATIVE
106

LEARN AND ADAPT AS TRENDS IN THE INDUSTRY AND/OR APPROACHES TAKEN BY FRAUDSTERS CHANGE
108

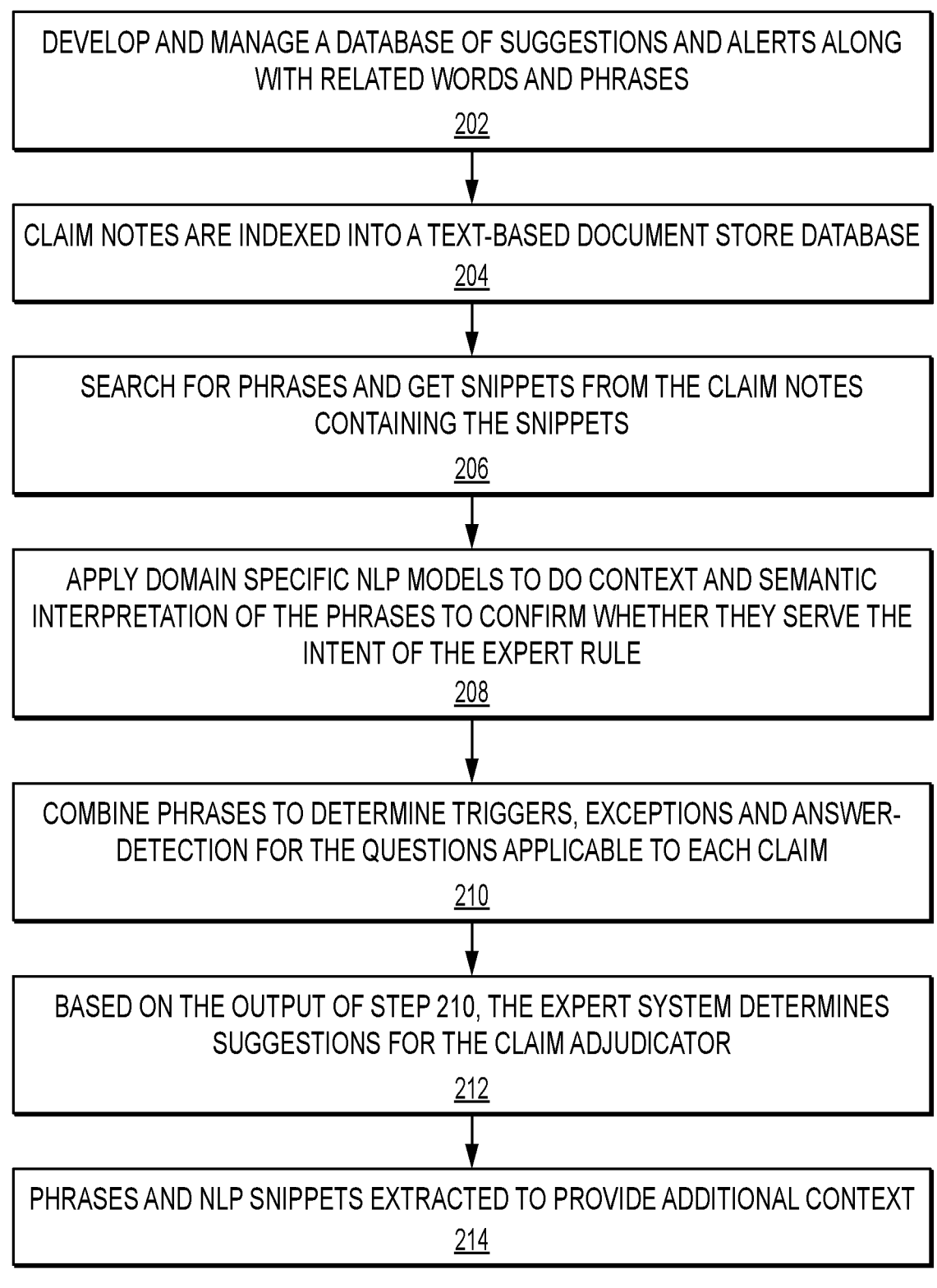

DEVELOP AND MANAGE A DATABASE OF SUGGESTIONS AND ALERTS ALONG WITH RELATED WORDS AND PHRASES
202

CLAIM NOTES ARE INDEXED INTO A TEXT-BASED DOCUMENT STORE DATABASE
204

SEARCH FOR PHRASES AND GET SNIPPETS FROM THE CLAIM NOTES CONTAINING THE SNIPPETS
206

APPLY DOMAIN SPECIFIC NLP MODELS TO DO CONTEXT AND SEMANTIC INTERPRETATION OF THE PHRASES TO CONFIRM WHETHER THEY SERVE THE INTENT OF THE EXPERT RULE
208

COMBINE PHRASES TO DETERMINE TRIGGERS, EXCEPTIONS AND ANSWER-DETECTION FOR THE QUESTIONS APPLICABLE TO EACH CLAIM
210

BASED ON THE OUTPUT OF STEP 210, THE EXPERT SYSTEM DETERMINES SUGGESTIONS FOR THE CLAIM ADJUDICATOR
212

PHRASES AND NLP SNIPPETS EXTRACTED TO PROVIDE ADDITIONAL CONTEXT
214

SPLIT EACH CLAIM NOTE INTO AN ARRAY OF SENTENCES
1502

IMPLEMENT DOMAIN NOISE REDUCTION
1504

HIERARCHICALLY CLUSTER THE 'TRUNCATED CLAIM NOTES' SENTENCES
1506

1500

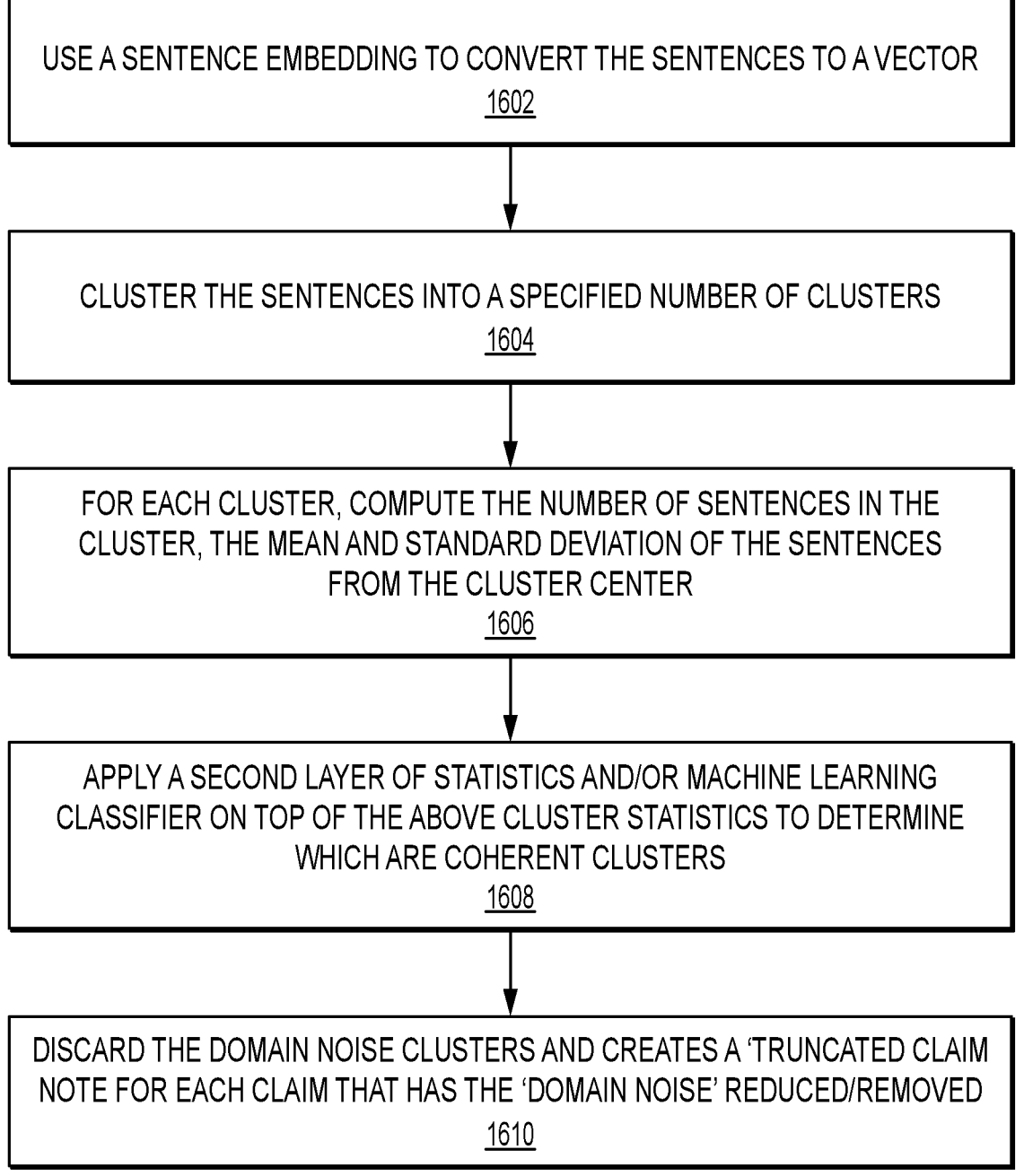

USE A SENTENCE EMBEDDING TO CONVERT THE SENTENCES TO A VECTOR
1602

CLUSTER THE SENTENCES INTO A SPECIFIED NUMBER OF CLUSTERS
1604

FOR EACH CLUSTER, COMPUTE THE NUMBER OF SENTENCES IN THE CLUSTER, THE MEAN AND STANDARD DEVIATION OF THE SENTENCES FROM THE CLUSTER CENTER
1606

APPLY A SECOND LAYER OF STATISTICS AND/OR MACHINE LEARNING CLASSIFIER ON TOP OF THE ABOVE CLUSTER STATISTICS TO DETERMINE WHICH ARE COHERENT CLUSTERS
1608

DISCARD THE DOMAIN NOISE CLUSTERS AND CREATES A 'TRUNCATED CLAIM NOTE FOR EACH CLAIM THAT HAS THE 'DOMAIN NOISE' REDUCED/REMOVED
1610

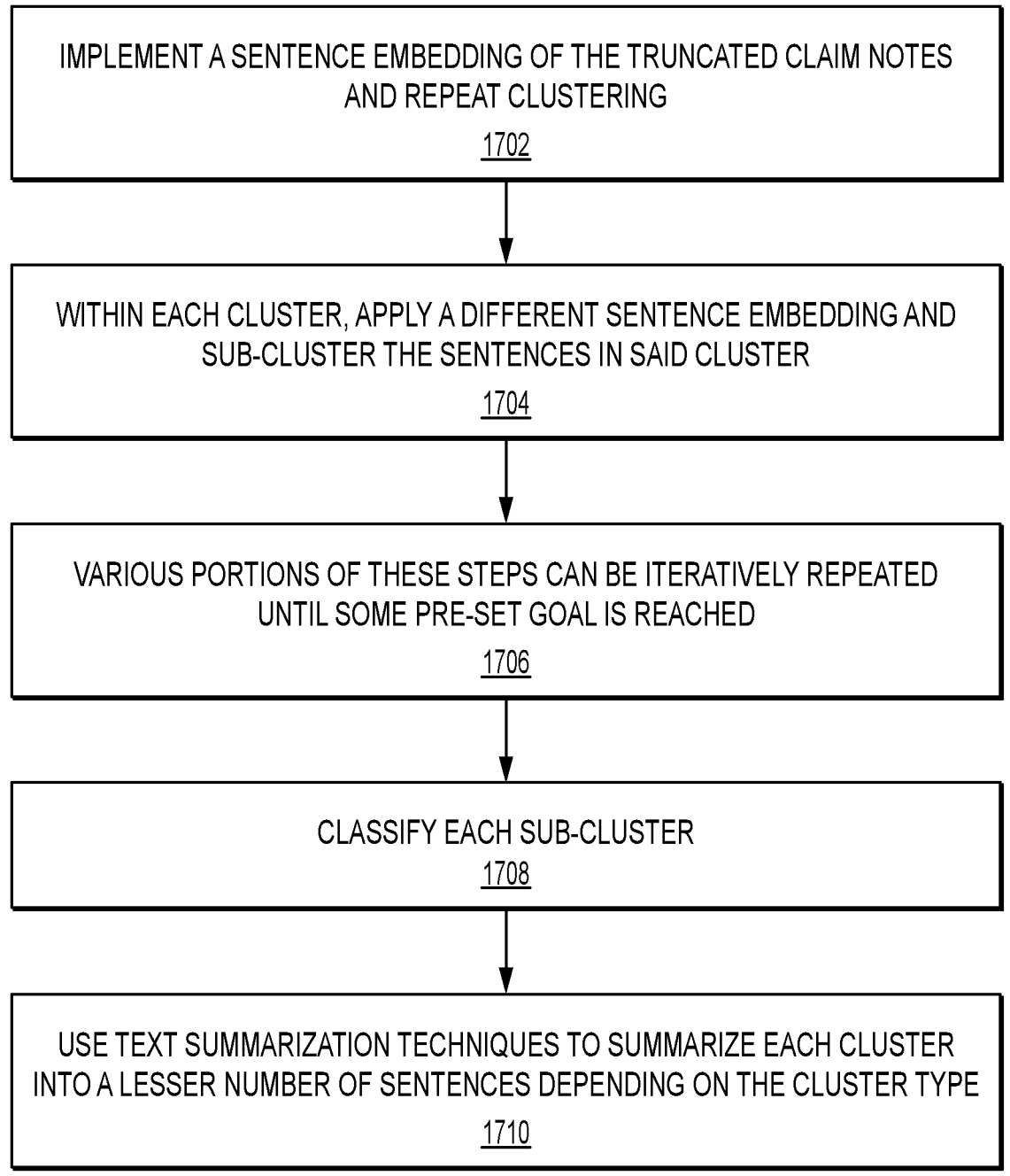

IMPLEMENT A SENTENCE EMBEDDING OF THE TRUNCATED CLAIM NOTES
AND REPEAT CLUSTERING
1702

WITHIN EACH CLUSTER, APPLY A DIFFERENT SENTENCE EMBEDDING AND
SUB-CLUSTER THE SENTENCES IN SAID CLUSTER
1704

VARIOUS PORTIONS OF THESE STEPS CAN BE ITERATIVELY REPEATED
UNTIL SOME PRE-SET GOAL IS REACHED
1706

CLASSIFY EACH SUB-CLUSTER
1708

USE TEXT SUMMARIZATION TECHNIQUES TO SUMMARIZE EACH CLUSTER
INTO A LESSER NUMBER OF SENTENCES DEPENDING ON THE CLUSTER TYPE
1710

RECEIVE A SET OF DOMAIN EXPERT HAS TAGGED PHRASES
1802

ONCE THE PHRASES ARE TAGGED, GROUP SEMANTICALLY SIMILAR PHRASES TOGETHER
1804

BASE FEATURES CAN THEN BE COMBINED HEIRARCHICALLY INTO FEATURES FOR MACHINE LEARNING
1806

IMPLEMENT VARIOUS TECHNIQUES TO DETECT THE FEATURES AT RUN-TIME
1808

1800

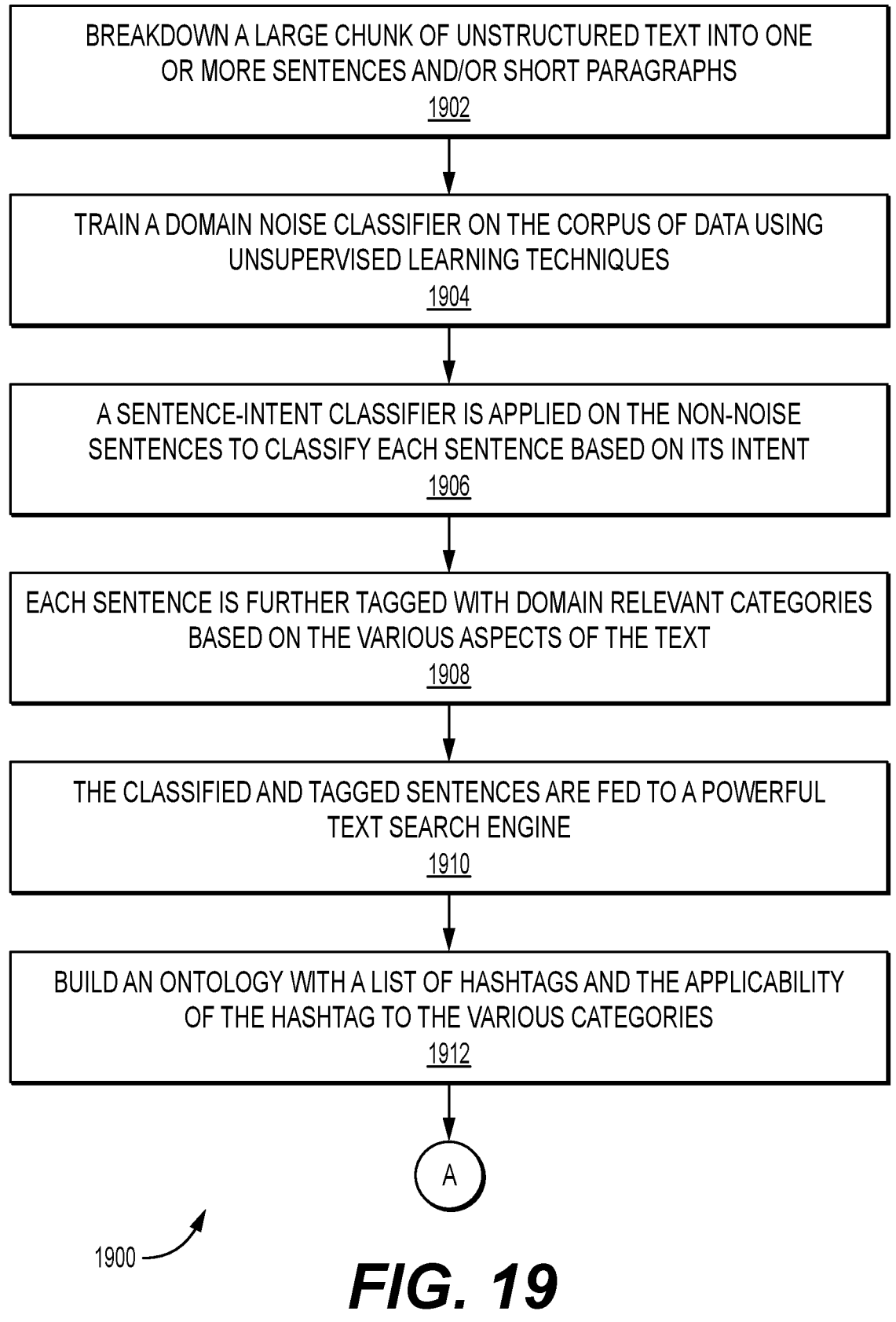

BREAKDOWN A LARGE CHUNK OF UNSTRUCTURED TEXT INTO ONE OR MORE SENTENCES AND/OR SHORT PARAGRAPHS
1902

TRAIN A DOMAIN NOISE CLASSIFIER ON THE CORPUS OF DATA USING UNSUPERVISED LEARNING TECHNIQUES
1904

A SENTENCE-INTENT CLASSIFIER IS APPLIED ON THE NON-NOISE SENTENCES TO CLASSIFY EACH SENTENCE BASED ON ITS INTENT
1906

EACH SENTENCE IS FURTHER TAGGED WITH DOMAIN RELEVANT CATEGORIES BASED ON THE VARIOUS ASPECTS OF THE TEXT
1908

THE CLASSIFIED AND TAGGED SENTENCES ARE FED TO A POWERFUL TEXT SEARCH ENGINE
1910

BUILD AN ONTOLOGY WITH A LIST OF HASHTAGS AND THE APPLICABILITY OF THE HASHTAG TO THE VARIOUS CATEGORIES
1912

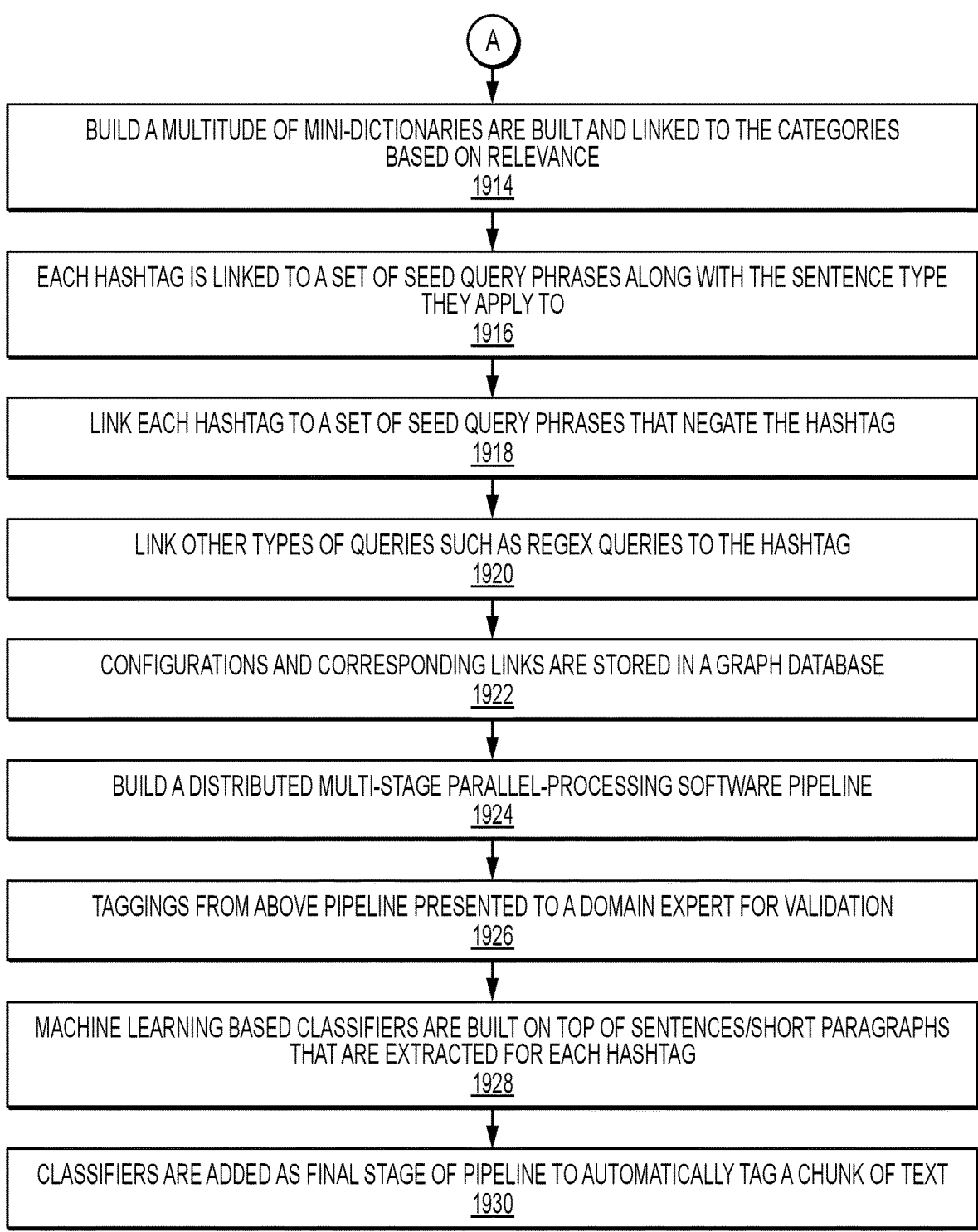

A

BUILD A MULTITUDE OF MINI-DICTIONARIES ARE BUILT AND LINKED TO THE CATEGORIES BASED ON RELEVANCE
1914

EACH HASHTAG IS LINKED TO A SET OF SEED QUERY PHRASES ALONG WITH THE SENTENCE TYPE THEY APPLY TO
1916

LINK EACH HASHTAG TO A SET OF SEED QUERY PHRASES THAT NEGATE THE HASHTAG
1918

LINK OTHER TYPES OF QUERIES SUCH AS REGEX QUERIES TO THE HASHTAG
1920

CONFIGURATIONS AND CORRESPONDING LINKS ARE STORED IN A GRAPH DATABASE
1922

BUILD A DISTRIBUTED MULTI-STAGE PARALLEL-PROCESSING SOFTWARE PIPELINE
1924

TAGGINGS FROM ABOVE PIPELINE PRESENTED TO A DOMAIN EXPERT FOR VALIDATION
1926

MACHINE LEARNING BASED CLASSIFIERS ARE BUILT ON TOP OF SENTENCES/SHORT PARAGRAPHS THAT ARE EXTRACTED FOR EACH HASHTAG
1928

CLASSIFIERS ARE ADDED AS FINAL STAGE OF PIPELINE TO AUTOMATICALLY TAG A CHUNK OF TEXT
1930

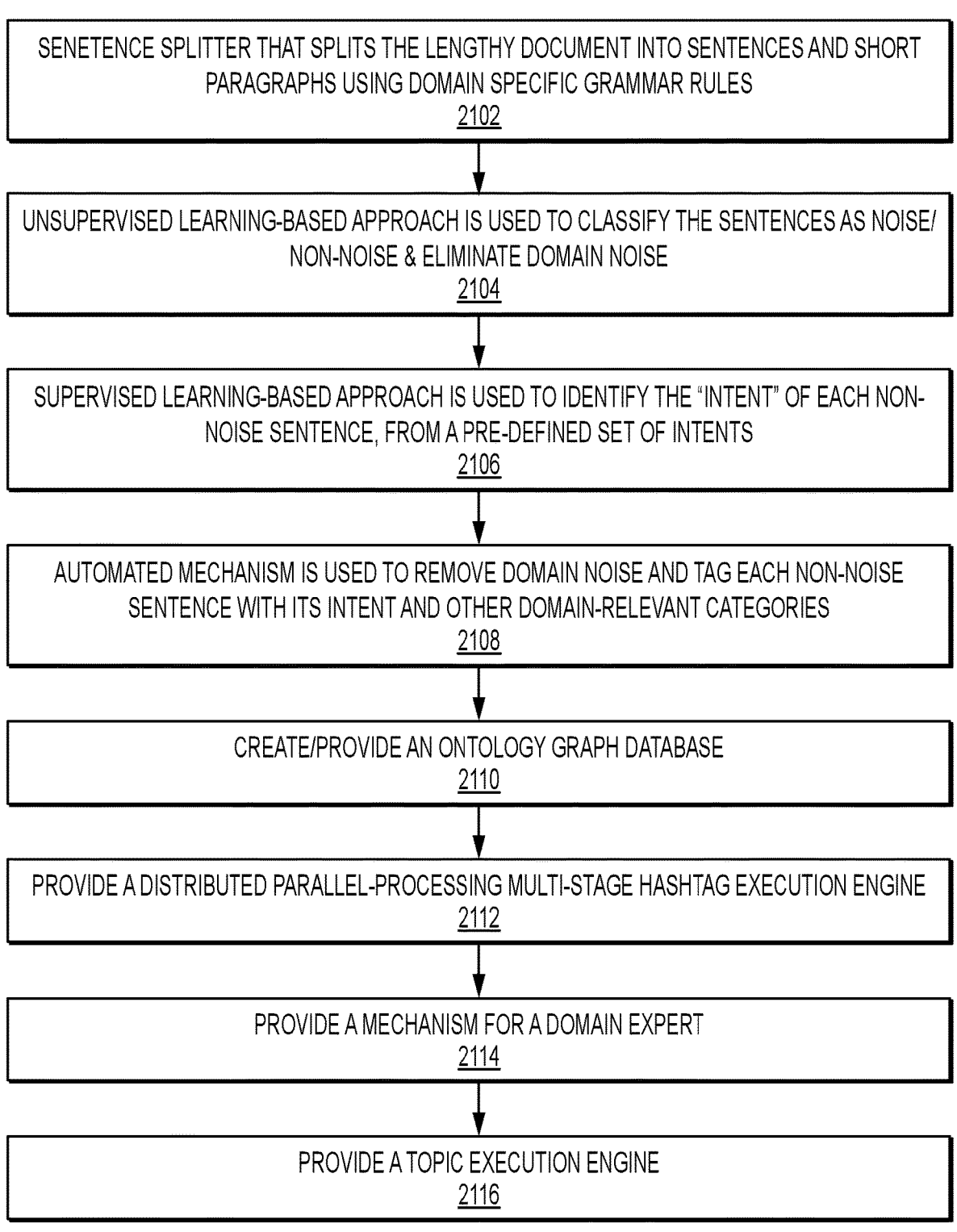

SENETENCE SPLITTER THAT SPLITS THE LENGTHY DOCUMENT INTO SENTENCES AND SHORT PARAGRAPHS USING DOMAIN SPECIFIC GRAMMAR RULES
2102

UNSUPERVISED LEARNING-BASED APPROACH IS USED TO CLASSIFY THE SENTENCES AS NOISE/ NON-NOISE & ELIMINATE DOMAIN NOISE
2104

SUPERVISED LEARNING-BASED APPROACH IS USED TO IDENTIFY THE "INTENT" OF EACH NON-NOISE SENTENCE, FROM A PRE-DEFINED SET OF INTENTS
2106

AUTOMATED MECHANISM IS USED TO REMOVE DOMAIN NOISE AND TAG EACH NON-NOISE SENTENCE WITH ITS INTENT AND OTHER DOMAIN-RELEVANT CATEGORIES
2108

CREATE/PROVIDE AN ONTOLOGY GRAPH DATABASE
2110

PROVIDE A DISTRIBUTED PARALLEL-PROCESSING MULTI-STAGE HASHTAG EXECUTION ENGINE
2112

PROVIDE A MECHANISM FOR A DOMAIN EXPERT
2114

PROVIDE A TOPIC EXECUTION ENGINE
2116

SYSTEMS AND METHODS FOR INSIGHTS EXTRACTION USING SEMANTIC SEARCH

CROSS REFERENCE TO RELATED APPLICATIONS

This application is a continuation-in-part of U.S. patent application Ser. No. 17/736,423, filed May 4, 2022, and titled COMPUTERIZED NATURAL LANGUAGE PROCESSING WITH INSIGHTS EXTRACTION USING SEMANTIC SEARCH, which is a continuation-in-part of U.S. patent application Ser. No. 16/798,277 filed Feb. 21, 2020, now U.S. Pat. No. 11,604,926, issued May 14, 2023, and titled METHOD AND SYSTEM OF CREATING AND SUMMARIZING UNSTRUCTURED NATURAL LANGUAGE SENTENCE CLUSTERS FOR EFFICIENT TAGGING, which claims priority to U.S. Provisional Patent Application No. 62/808,302, filed Feb. 21, 2019, and titled METHOD AND SYSTEM OF AN AUTOMATED ASSISTANT FOR INSURANCE CLAIMS INVESTIGATION AND RED FLAGGING. The above-listed patent documents are hereby incorporated by reference in their entirety.

BACKGROUND

Natural language processing (NLP) refers to the branch of computer science—and more specifically, a branch of artificial intelligence (AI) concerned with giving computers the ability to "understand" text and spoken words in a fashion that mimics human understanding. NLP combines computational linguistics, that is, rule-based modeling of human language, with statistical, machine learning, and deep learning models. Together, the goal of employing these technologies is to enable computers to process human language in the form of text or voice data and to "understand" its full meaning, including the speaker's or writer's intent and sentiment.

SUMMARY

A computerized method for extracting domain specific insights from a corpus of files containing large documents includes breaking down large chunks of text from the documents into smaller sentences/short paragraphs in a domain specific way; identifying and removing domain noise from the sentences/short paragraphs; identifying intents of non-noise sentences/short paragraphs; tagging the sentences/short paragraphs with other domain specific attributes; defining a semantic ontology using a graph database based on the intents, a multitude of mini-dictionaries, and domain attributes; applying a pre-defined ontology to tag documents with domain specific hashtags; and combining the hashtags using machine learning techniques into insights.

A method for extracting semantic hashtags representing topics in one or more domain-specific documents, each topic relevant to achieving a goal of a domain-specific entity includes a processor executing a routine to split a domain-specific document into data objects, the data objects comprising sentences and paragraphs, using grammar rules specific to the domain-specific entity; applying an unsupervised learning model to classify the data objects as one of noisy data objects and non-noisy data objects for the domain-specific entity; discarding the noisy data objects; applying a supervised learning model to identify, based on a pre-defined set of intents, an intent of each non-noisy data object; tagging each non-noisy data object with its identified intent;

applying the identified intent to an ontology graph base to identify a corresponding semantic hashtag; annotating each non-noisy data object with its corresponding semantic hashtag; and using one or more semantic hashtag-annotated non-noisy data objects, generating, for the domain-specific entity, a recommended action for achieving the goal.

A system for efficient topic extraction, and corresponding semantic tagging, from a corpus of documents related to a domain of interest, a document comprising text data objects, each extracted topic relevant to achieving a goal of a domain-specific entity, the system includes one or more processors; one or more human-user interfaces; and a non-transitory, computer-readable storage medium having encoded thereon, machine instructions that when executed, cause the one or more processors to: execute a routine to split a domain-specific document into data objects, the data objects comprising sentences and paragraphs, using grammar rules specific to the domain-specific entity, apply an unsupervised learning model to classify the data objects as one of noisy data objects and non-noisy data objects for the domain-specific entity, discard the noisy data objects, apply a supervised learning model to identify, based on a pre-defined set of intents, an intent of each non-noisy data object, tag each non-noisy data object with its identified intent, apply the identified intent to an ontology graph base to identify a corresponding semantic hashtag, annotate each non-noisy data object with its corresponding semantic hashtag; and using one or more semantic hashtag-annotated non-noisy data objects, generate, for the domain-specific entity, one or more recommended actions for achieving the goal.

A computer-implemented method for achieving a goal of an end user, includes receiving a document provided by the end user, the document comprising unstructured data related to a domain of interest; and processing the unstructured data to identify the domain of interest and a corresponding scenario and context, which includes using domain-specific sentence structure and boundary rules, and domain-specific grammar rules, parsing the unstructured data to identify data objects in the document, the data objects comprising words and phrases, applying a trained, domain-specific noise classifier to identify noisy data objects and non-noisy data objects and discard the noisy data objects, and processing the non-noisy data objects, using a natural language processor, to identify a scenario and a context of the document. The method further includes using expert configured and learned data objects relevant to the scenario and the context, searching the non-noisy data objects from the document to identify actions relevant to achieving the end user goal; applying a rules engine to determine non-completed actions from actions identified as relevant to achieving the end user goal; generating a non-completed actions list for actions determined as non-completed; identifying, based on the scenario and the context, a domain-specific severity associated with each non-completed action; scoring and prioritizing each non-completed action based on the severity, wherein a non-completed action with a highest severity is assigned a highest score and priority; and presenting to the end user, a recommended list of next actions to complete comprising one or more of the non-completed actions arranged in order of highest priority to lowest priority.

DESCRIPTIONS OF THE DRAWINGS

The detailed description refers to the following figures in which like numerals refer to like objects, and in which:

FIG. 1 illustrates an example process for using an AI assistant/bot in the FNOL phase of an automated insurance claim analysis.

FIG. 2 illustrates an example process for implementing an expert system.

FIG. 16 illustrates an example process for implementing a domain noise reduction phase.

FIG. 17 illustrates an example process for hierarchically cluster the 'truncated claim notes' sentences.

FIGS. 19 and 20 illustrates an example process for implementing computerized natural language processing with insights extraction using semantic search.

FIG. 21 illustrate another example process for implementing a computerized natural language processing with insights extraction using semantic search.

DETAILED DESCRIPTION

Figure 25:
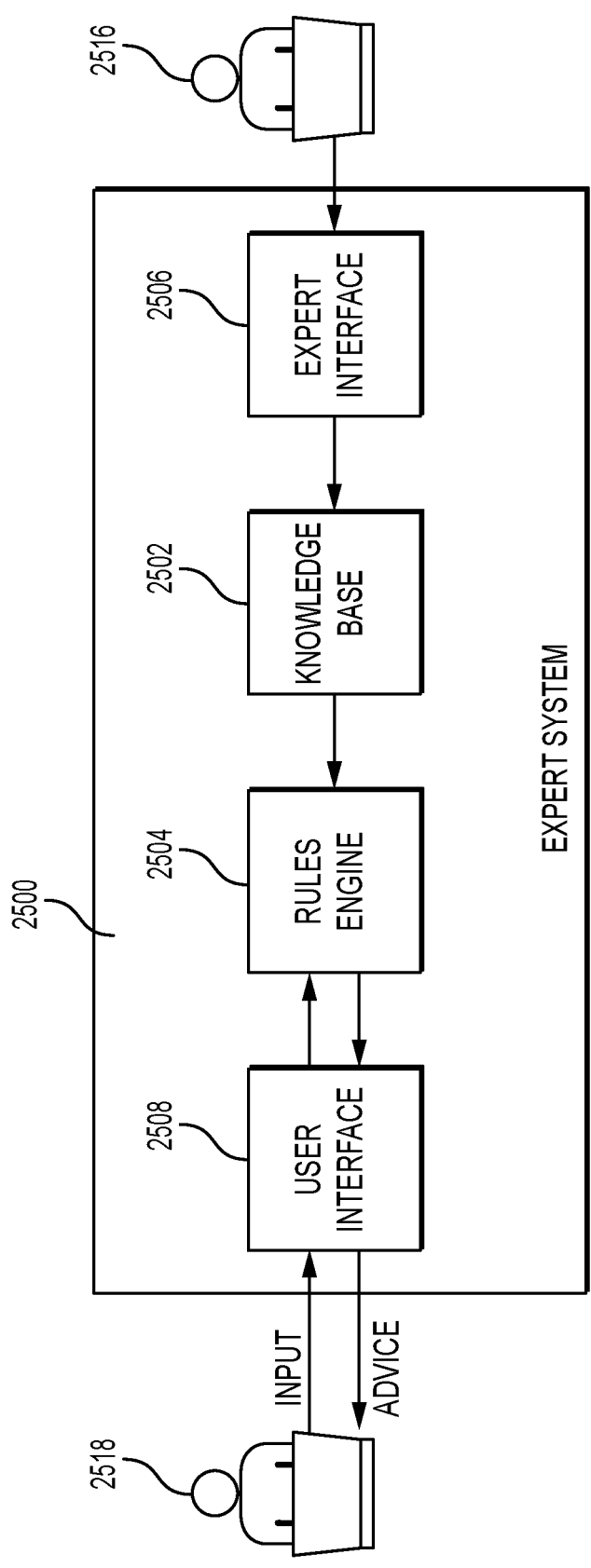
FIG. 25 illustrates a traditional expert system.

Semantics is a branch of linguistics and logic concerned with meaning. There are a number of branches and subbranches of semantics, including formal semantics, which studies the logical aspects of meaning, such as sense, reference, implication, and logical form, lexical semantics, which studies word meanings and word relations, and conceptual semantics, which studies the cognitive structure of meaning. Natural Language Processing (NLP) refers to a branch of computer science—and more specifically, a branch of artificial intelligence (AI) —concerned with giving computers the ability to "understand" text and spoken words in a fashion that mimics human understanding. That is, a goal of natural language processing is to perform a machine-adapted semantical analysis that mimics human semantical analysis. Natural language processing combines computational linguistics, that is, rule-based modeling of human language, with statistical, machine learning, and deep learning models. These technologies are employed to enable computers to perform a machine-based semantical analysis of human language, where a human language sample, typically, is presented in the form of text or voice data, so as to "understand" the full meaning of the human language sample, including the speaker's or writer's intent and sentiment. However, current NLP implementations, particularly when applied to a large corpus of unstructured-text documents, are not able to consistently, reliably, and accurately "understand" the speaker's or writer's intent and sentiment. This limited "understanding" stems from at least two distinct, but related, factors, namely the complexity of human language, and inherent deficiencies in current NLP systems. For example, current NLP systems may be employed to translate text from one language to another language, respond to spoken commands, or analyze and summarize a large corpus of text documents. However, human language, written and spoken, often is so filled with ambiguities that current NLP systems cannot accurately determine the writer's or speaker's meaning and intent. This situation may be exacerbated when the NLP system is presented with a large amount of text data; this situation may be further exacerbated when a sample of human language is presented to the NLP system as "unstructured text data." Thus, current NLP-based computer systems tasked with processing a large "chunk" of unstructured or structured text or other data may not accurately identify various topics, events, and nuances in either the structured or the unstructured text data. A "chunk" may be an entire document, a section of a document, a paragraph of a document, or any other accumulation of text or other data in a document. A "chunk" may be a graph, a figure, a drawing, or an image. In addition to the inherent ambiguities in human language, sometimes topics, events, or nuances of interest may only be mentioned briefly in the document and/or may only appear in a minority of documents in a large corpus of documents; however, such a brief mention in one document or in a minority of documents may significantly affect the results of the natural language processing. Moreover, human monitoring of enormous volumes of data generated by various information sources is unfeasible, and reliance on computer-implemented processes may be required to properly assess the content of the corpus of documents. Some efforts to improve assessment of data generated by various information sources involves application of an "expert system." FIG. 25 illustrates a traditional expert system. In FIG. 25, expert system 2500 includes knowledge base 2502, rules engine 2504, and user interfaces 2506 and 2508. Human expert 2516 accesses system 2500 through interface 2506 and non-expert human user 2518 accesses system 2500 through interface 2508. Knowledge base 2502 receives inputs from human expert 2516; the inputs, derived most likely from structured data sources, may include rules specific to a particular domain (e.g., insurance). The thus-provided rules are provided to rules engine 2504. Rules engine 2504 may be a processor-implementable module that includes a set of if-then rules to be applied to inputs from non-expert human user 2518 through interface 2508. Application of the if-then rules to the non-expert human user-provided inputs generates advice or suggestions that then are sent to the non-expert human user 2518 through interface 2508. However, traditional expert systems such as expert system 2500 cannot adequately assess data in situations involving, for example, unstructured data, and more particularly a large corpus of documents that contain unstructured data. This defect in expert system 2500 stems in part from the fact that the rules provided by interaction of the human expert 2516 are derived from structured data, whereas the non-expert human user 2518 is tasked with reviewing the large corpus of unstructured data documents. Furthermore, the knowledge base 2502, from which the rules are derived, requires manual updating (by the human expert 2518) over time. Still further, knowledge base 2502, while configurable by a human expert, cannot be configured through processor-aided application of rules that can be learned using machine learning techniques. In addition, rules engine 2504 applies natural language processing techniques, but does not involve machine learning in a way so as to generate inferences as to the input data while still maintaining explainability of the inference. The result of these defects in the traditional expert system 2500 is that the system cannot be used to draw inferences accurately and directly from the unstructured data inputs provided by the non-expert human user 2518.

A specific example of the limitations inherent in use of a traditional expert system may be seen in the case of insurance claim processing, which typically involves computer-based analysis of a large corpus of documents in the form of unstructured text such as claim notes and other unstructured-text documents. Other documents of interest may include structured data. Each claim note may span tens to hundreds of pages, and may include abbreviations, shorthand text objects, mis-spelled words, insurance industry jargon, including specific insurance company ("Insurer") jargon, and other ambiguous text objects. Furthermore, the "severity" (i.e., the financial effect on the Insurer, and/or the need for quick action by the Insurer) of some insurance claims may not be discerned by current NPL systems. For example, some insurance claims may involve the use of medical specialists, such as orthopedic surgeon, and while insurance claims involving an orthopedic surgeon may be in the minority of all claims (e.g., around 15%) those claims often end up with a higher "severity" than other claims. Furthermore, for insurance claims where an orthopedic surgeon is involved, such an entity (i.e., orthopedic surgeon) may only be mentioned once or twice in the entirety of a claim note or corpus of claim notes.

In another example, a minority of all insurance claims (e.g., 12-20%) may involve "emotions going sour," where, as a further example, a claimant threatens to seek an attorney. However, claims that "go sour" and result in litigation tend to be the most expensive to the Insurer, and claims merely involving a threat to seek an attorney may need immediate attention to prevent litigation. Further complicating current NLP-based analysis, when a claimant threatens to seek an attorney, that threat may only be noted once in the claim notes.

At the same time, the corpus of documents may contain repetitive occurrences of certain text objects which current NPL systems may mis-identify as indicating the presence or occurrence of an event; i.e., the NLP system produces a "false positive." When extracting the topics/event using NLP, it is critical to ensure that such text does not lead to false positives. For example, insurance claim notes sometimes include cut and paste of boiler plate language or a template such as "Claimant threatens to seek attorney? Yes/No". Such language or template may be presented as a "check-the-box" item in a templated claim note. This language may only be present in certain claims, yet an Insurer should ensure that such claims are incorrectly identified as the claimant threatening to seek an attorney. Mis-identifying such claims may result in unnecessary escalations and increasing the workload of a claims adjustor, thereby adding to the expense of claim resolution.

The problems of correct text interpretation may be compounded by the fact that the text in a claim document may not follow typical rules of grammar. Also, different documents within a corpus of claim documents may follow different rules of grammar. Additionally, the same text across a single document or multiple documents may present different nuances, which needs to be carefully identified to avoid false positives or false negatives. For example, in the above insurance claims example, claims adjustors may use shorthand notion such as "Clmt threats atty—no", "no clmt atty threat", etc. Different claim notes may have variations of similar looking text, but with very different connotations, such as "Claimant threatens attorney? No", "Claimant threatens attorney? Yes", "If claimant threatens attorney Escalate", "Claimant not threatens attorney", etc. The above nuances or connotations make extracting insights, topics, and events a non-trivial task. Extracting insights accurately from unstructured claims data is critical to insurance use cases such as litigation prediction and severity prediction.

Topic extraction techniques such as Latent Dirichlet Allocation (LDA) focus on extracting topics where the keywords identifying the topics are found multiple times in a text and are found in a majority of the documents in the corpus. For example, if a large majority of insurance claims in the corpus include a threat of the claimant seeking an attorney, and the threat is mentioned multiple times in each document, such techniques would identify "claimant attorney threat" as a significant topic. However, for the problem statement given above, where claim documents do not follow typical rules of grammar, different documents within a corpus follow different rules of grammar, or the same text across a single document or multiple documents present different nuances, such techniques likely would miss identifying "claimant attorney threat" as a topic. Thus, current keyword and phrase search techniques may result in either false positives or they could end up with a lot of false negatives, since such techniques do not include a semantic interpretation of the text.

Current keyword and phrase search techniques also may result in false positives due to the same word meaning different things in different contexts. For example, in the sentence "she had a sprain", sprain refers to a physical injury; whereas in the sentence "the shingles were sprained", the same word sprain refers to a roof damage. Keyword searches do not differentiate between these contexts. Keyword search also cannot differentiate between "she had a sprain" and "she had no sprain". Machine learning based classifier models trained on the complete text are subject to "noise" in the data, which makes training the classifier models difficult and very time consuming.

Named Entity Recognition (NER) based approaches also may generate much "noise" during topic extraction due to imperfect grammar in the text. Techniques such as BIO tagging are very time consuming and subject to overfitting due to the sparse nature of the topics/events in the text. Today's state of the art techniques fall short in solving the above problem and hence a new invention is needed.

In summary, current implementations of NLP processing are not able to consistently, reliably, and accurately analyze a large collection, or corpus, of structured and/or unstructured text documents so as to "understand" the collection's full meaning, including the or writer's intent and sentiment. Thus, current NLP-based computer systems may process a large chunk of unstructured text but may not accurately identify various topics, events, and nuances in the data.

To overcome these clear deficiencies with current NLP processing implementations, disclosed herein are systems and methods for extracting insights from one or more text documents. The text documents may be presented in the form of unstructured text data. Extracted insights accurately reflect the intent of the text data by execution of routines for identifying and analyzing topics, events, entities, and nuances as explicitly written in the text data and as implicitly present in the text data. The same or similar routines may be applied to structured text data. Other routines may be applied to non-text data such as images (e.g., jpeg images). Furthermore, routines may be executed to convert audio to text data for further analysis. The herein disclosed systems and methods achieve a high level of accuracy and reliability by employing mechanisms and processes that avoid false positives and false negatives in the analysis. In an example, a processor may begin by executing the herein disclosed natural language processing by employing various text parsers such as, for example, sentence parsers, to parse, or break down a set of large "chunks" of text (structured or unstructured data) into smaller sentences and short paragraphs (e.g., paragraphs with three to five sentences). The sentence parsers may execute in a domain specific way; that is, the sentence parsers may break down the text chunks using rules that account for the way such text chunks are expected to be present in text documents commonly found in a specific domain, or industry, such as text documents used in insurance claim resolution or adjudication. In parallel with the domain-specific text parsers, other text parsers may be employed. Such other text parsers may for example, operate according to general writing conventions. One aspect of this text break-down, or text parsing, operation is the employment, disclosed herein, of innovative systems and techniques to identify sentence boundaries in situations in which a writer does not follow normal grammar rules, uses jargon or acronyms, or for other situations that may result in text having unclear meanings. For example, when a sentence includes a colon or question mark followed by text in a new line, or when a "/" character is included in the sentence, a trained sentence parser may interpret the sentence as boilerplate text with answers—in which case the sentence parser classifies text following the colon or question mark as part of the sentence. Thus, the sentence parser might classify "Claimant threatens to seek attorney? No." as one sentence, with the result that the NLP process evaluates the text as "claimant does not threaten to seek attorney." As noted, the text parsing is executed in a domain specific way, meaning that, for example, the text is to be parsed so that it may be interpreted in consideration of a domain-of-interest, such as insurance claims adjudication and resolution. One feature of any domain is "domain noise," where noise may include any text object (word, phrase, sentence, short paragraph) that is not relevant to the specific incident being processed, but exists in the text. For instance, in the example of an insurance claim, a claims adjuster investigating and evaluating an incident may cut and paste content from a website that talks about a related incident (but not the same incident as that being investigated); alternately or in addition, the claims adjustor may cut and paste text from prior similar claims and/or may copy and paste legal proceedings from a similar past claim. These cut and pasted excerpts, while possibly containing meaningful information (that a traditional noise classifier would not classify as noise), may not be relevant or usable for the specific incident being investigated and evaluated. Specific examples of domain noise include: a template text without an answer may be classified as domain noise; misspelled words for which no correctly-spelled word can be identified based on the context of the text object and the domain of interest; grammatical errors that similarly have no known solution based on the context of the text object. To better address the problem of "domain noise" in a corpus of documents, the herein disclosed systems may include one or more domain noise classifiers that operate to identify and remove domain noise. The domain classifiers may be trained on a corpus of documents using unsupervised learning techniques. The domain classifiers may identify text objects (sentences, phrases, words) as either noise or non-noise. Multiple domain noise classifiers may be trained and applied to the same corpus of documents. Domain noise classifiers may be trained according to a specific industry, and within that industry, different lines of business. In the example of the insurance domain, different noise classifiers may be trained for home insurance claims, personal injury claims, and medical malpractice claims. Each domain, industry, and line of business may have its own unique instances of domain noise, in addition to domain noise that is common across all industries and all lines of business. Taking the example of an insurance claims adjustor process, a document having a template without a corresponding answer may be identified and classified as domain noise. The processor, executing the herein disclosed routines, then may apply a sentences (or text object) classifier to non-noise sentences or text objects to identify sentence or text object intents. For example, a non-noise sentence could be classified as an affirmative sentence, a negation sentence, a tentative sentence, and a conditional sentence. More specific examples based on "Claimant threatens to seek attorney?" include: "Clmt threatens to seek atty" may be classified as an affirmative sentence; "Claimant threatens to seek attorney? No." may be classified as a negation sentence. However, "claimant threatens to seek attorney? N/A" may be classified as a noise sentence. With non-noise sentences/text objects classified, the processor may execute a tagging routine in which each non-noise sentence or text object is tagged with domain-relevant categories based on various aspects or attributes of the text. In the example of insurance claim notes, a sentence may be tagged with a line of business ((LOB) such as Auto, Homeowners), and coverage, such as Bodily Injury, Property Damage. The classified and tagged sentences then may be fed to a text search engine such as Apache Solr or Elastic Search, which performs transformations such as stemming and lemmatization the text to support fuzzy searches. Next, the processor may execute a routine to define a semantic ontology using a graph database based on the sentence intents. The processor may execute routines to apply a pre-defined ontology, or generate a new ontology, to tag documents with one or more domain specific hashtags; and combine the hashtags using machine learning techniques into insights. Thus, the ontology may include a list of hashtags and for each hashtag, its applicability to a previously-defined category. For example, the hashtag #SoftTissueInjury may be indicated as applicable {LOBs: (Auto, General Liability); Coverages: (Bodily Injury, Slip and Fall). The processor then may execute routines to generate one or more Each mini-dictionary may include one or more domains and corresponding domain attributes, and each mini-dictionary may be linked to one or more domain-relevant categories. In an aspect, to simplify and expedite the mini-dictionary generation process, the processor may employ models such as word2vec and Glove, as well as large language models such as BERT. Examples of entries in a mini-dictionary include: {LOB: "Auto," Coverage: "Bodily Injury"}: strain=strain, sprain, twist; {LOB: "Homeowners," Coverage: "Property Damage"}: strain=strain, fracture, crack; and {LOB: "Auto," Coverage: "Emotional Injury"}: strain, tiredness. In an aspect, the processor may link each hashtag (#) to a set of speed queries along with an appropriate type to which the speed queries may apply. An example is: #SoftTissueInjury: (i){Affirmative Sentence}→"soft tissue entry," "strain," "neck pain"; and (ii){Negation Sentence}→"not serious injury." Additionally, each hashtag is also linked to a set of seed query phrases that negate the hashtag. For example, #SoftTissueInjury: NOT {Accusatory Sentence}=>"pain in the neck" In some cases, other types of queries such as regex queries, etc. may also be linked to the hashtag. For example. #SoftTissueInjury: REGEX {Affirmative Sentence}=>/.*soft-tissue.*/All of the above configurations and corresponding links are stored in a graph database such as Neo4j, TigerGraph, SolrGraph, etc. for efficient access. The structure of the graph database provides an implicit rules hierarchy. A distributed multi-stage parallel-processing software pipeline is built that reads the above configuration and runs through a corpus of documents to identify sentences that match each hashtag. The taggings from the above pipeline then are presented to a domain expert for validation. The short paragraph each sentence belongs to may be presented for additional context. Machine learning and LLM based classifiers can now be built on top of the sentences/short paragraphs that are extracted in a focused manner for each hashtag. In production deployment, these classifiers are added as the final stage to the above processing pipeline to automatically tag a chunk of text (e.g., claim notes) with a list of semantic hashtags, topics, and events; along with temporal information on when the hashtag/topic/event was detected in the document. The tagged documents can be further used for trends analysis, patterns determination, predictive modeling, workflows, and other use cases. The processor may implement a distributed multi-stage, parallel-processing hashtag execution routine that uses the ontology graph database to automatically tag the non-noise sentence with one or more domain-relevant semantic hashtags; provide a mechanism for labeling and training semantic topic classifiers based on the hashtags; and provide a topic execution engine that further classifies the hashtags to semantic topics and tags each original document in the corpus with a list of semantic temporal topics. In an aspect, the ontology graph database comprises a set of sentence classes equating to a set of intents, a set of domain-relevant categories, a plurality of mini-dictionaries, and a set of hashtags with applicable categories and types of queries.

To further address defects in current NLP systems, in an aspect, the herein disclosed NPL systems and corresponding methods may use a machine learning capability of a neural network to provide accurate filtering and processing of a large corpus of documents. The neural network may interact with components of a natural language processor (NLP) to derive contextual information from the documents. In the context of a machine learning system that implements a neural network, the neural network's input layer may represent a base level of data points as categorized from the documents; these data then are relayed through a series of layers with each node holding a set of specific "weights" that analyze parsed sections of a document to determine validity of the "contextual interpretation." By teaching the neural network the difference between correct and incorrect outputs through modification of the weights, the neural network refines its ability to discern between false and true interpretations.

Semantics may be useful for interpreting these documents, and the system may determine common or industry-specific phrases, abbreviations, and uses of language that may go unnoticed by a simple keyword search or analysis. Accurate reporting of data may require an iterative process to improve capabilities and keep up with syntax used in the documents.

The system may include additional hardware and/or software components to read documents using a method of image recognition. For text-only documents, simple optical character recognition (OCR) may be used. However, some documents may include images (sketches, photographs (jpeg images), video, and other non-text data, including audio). The system identifies instances of correct context by identifying pertinent information found within text and non-text portions of the documents. For example, by relating a particular pattern of pixels within an image to an object(s) or landmark the system has stored within its memory the system will be able to classify images as to their actual identity and corresponding relevance to a topic of the corpus of documents. Training data can be used to allow the system to recognize specific images of real-world objects.

A natural language processing (NLP) system may be or may include a machine learning system, or may be a component of the machine learning system. The NLP system may receive a document and may search the document to identify specific words, terms, or other data elements using, for example, named entity recognition, industry specific phrases (e.g., jargon), and common phrases and words. The NLP system then may predict the statement of the subject matter (i.e., the domain of interest) of the document or make other predictions related to the document. For example, the NLP system may predict, with some confidence level, that a document relates to a vehicle crash for which an insurance claim may be filed.

In an aspect, the herein disclosed NLP system may be a targeted system in the sense that the system incorporates defined terms. Alternately or in addition, the herein disclosed NLP system may be trained using training examples from well-behaved sources. For example, news reports, insurance claim notes, and other documents that have been human-annotated with part-of-speech tagging may be used as training examples to train a natural language processing model. When the NLP system has been trained on training examples from a well-behaved source and then is given inputs such as an insurance claim note, or documents related to an insurance claim (e.g., an email from a claimant), the results (i.e., accuracy in defining a context or intent of a document) may be much worse than when the NLP system is given inputs similar to the training examples. That is, a trained NLP system may not perform as well in certain applications and scenarios as the system's training might suggest. One reason is that many documents may be short, grammatically unsound, and lacking in context. The NLP system may have difficulty identifying the part-of-speech of words in such a document, including disambiguating syntactically confusable labels, determining the syntactic structure of the text, recognizing images, and converting audio data items to text. This confusion may reduce the usefulness of the NLP system in interpreting some documents.

To improve its performance, the herein disclosed NLP system may be trained using a training data set including a training example set to which annotations may be added (for example, by a human expert) to obtain an annotated training data set. The NLP system then may be trained using the annotated training data set to obtain a trained NLP system. The NLP system also may predict if a data item, or mention, in a document is an accurate reflection of the intended use of the data item or mention, along with a confidence score for the prediction. A prediction with a confidence score below a threshold (e.g., 75%) may be filtered out (as, for example "noise"). The annotations incorporated by the NLP system may be used by the NLP system to evaluate the prediction of the NLP system. For example, the NLP system may use the annotations in a supervised learning process to learn from domain experts. The NLP system may also use the annotations in conjunction with a large language model to identify other, similar text objects and correlate the text objects—thereby going beyond the annotations provided by the domain experts (but using the annotations) in training and evaluating the NLP system. Part-of-speech tagging in the training data sets also may be used to evaluate the prediction of the NLP system.

To train a natural language processing system to make better predictions on documents input from poorly-behaved sources, such as, for example, insurance claim documents, a herein disclosed disambiguation system may include, besides human expert annotation, various mechanisms to implement the desired annotations. In an example, an information retrieval system may be used to annotate data items. The information retrieval system annotations may relate various parts of the text to, for example, a knowledge graph, a concept graph model, and a named entity repository, and may identify data items (parts of the text) as multi-word expressions, phrases, and proper names. As described herein, these information retrieval system annotations may be used to assist in the training of a natural language processing system. For example, the NLP system may have difficulty disambiguating verbs and adjectives that are being used as proper nouns in the context of an insurance claim document. Annotations generated by an information retrieval system may help to train the NLP system to make better predictions regarding such ambiguous words and phrases. For example, the accuracy of the NLP system's part-of-speech predictions may be evaluated against both the part-of-speech tagging and information retrieval system annotations in the training examples during supervised training. The accuracy evaluation may be used to adjust the NLP system, resulting in an improved trained NLP system.

After training, the NLP system may be used to make predictions for new input documents. The trained NLP system may be given input text that has been annotated by an information retrieval system or by a human expert. The trained NLP system may make predictions for the text. Specific examples of such predictions include named entity recognition predictions, or identification of industry-standard terms. More generally, such a prediction may identify any mention of a named entity or domain of interest, and such entities and/or concepts then may be classified into groups of similar meaning. Each prediction may be assigned a confidence score by the trained NLP system, and the confidence score for some predictions may be adjusted based on the information retrieval system annotations for the input text. Thus, the processor may execute machine learning programs including supervised machine learning to identify the sentence intents and unsupervised machine learning techniques to classify sentences as one of a noise sentence and a non-noise sentence. These computer-based mechanisms, processes, techniques, and methods provide a significant technological advance over current NLP implementations. In particular, the herein disclosed mechanisms, processes, techniques, and implementations provide increased processing speed and enhanced accuracy, more focused training and model tuning for each hashtag, and increase accuracy in identifying topics, events, and issues due to reduced domain noise, sentence intent identification and understanding, and text object tagging. The herein disclosed mechanisms, processes, techniques, and implementations address the many shortcoming in current state of the art mechanisms, processes, techniques, and methods How this invention addresses the shortcomings of the state of the art: a) LDA Shortcoming of not extracting niche topics: Since this invention breaks down documents into mini-documents, probabilistic techniques can now be applied on these mini-documents to identify more focused hash tags. The probabilistic techniques can also be goal-focused, e.g., find hashtags unique to high severity insurance claims. These hashtags can be further developed using the techniques above for accurate topic identification. This technique can now identify niche topics. b) Keyword search boiler plate issue: Noise reduction techniques in this invention helps remove the noise and focus the topic extraction on relevant text. c) Contextual semantics issues (e.g., "leg sprain" versus "shingles sprain", "has sprain" versus "no sprain": The above technique enables context-sensitive hashtags and the context can be determined by various factors in the meta-info. Further, the "sentence intent" enables us to apply the searches only on sentences that have the desired intent. d) Noise issue: Noise reduction techniques help reduce domain noise. e) Grammar rules issues: Custom sentence splitter and intent classifier help identify topics in the presence of inaccurate grammar. f) Memory/CPU requirements and processing speed: We don't need to train a LLM from scratch on a large corpus. Since the technique breaks down entire document using multiple ways, it can narrow down and focus the extractions on smaller chunks, thereby reducing memory and CPU needs. When used in conjunction with techniques such as compressed inverted indexing, it further reduces memory and CPU needs. The technique is also very amenable to parallel processing, which may reduce processing time.

Terms and Definitions

The disclosure uses the following terms and their definitions; however, neither the terms nor their definitions are exhaustive:

APACHE SOLR is an open-source enterprise search platform, written in JAVA, from the APACHE LUCENE project. APACHE SOLR includes full-text search, hit highlighting, faceted search, real-time indexing, dynamic clustering, database integration, NoSQL features and rich document (e.g., Word, PDF) handling.

Automated assistant may be a software agent that can perform tasks, or services, on behalf of an individual based on a combination of user input, location awareness, and the ability to access information from a variety of online sources.

Bag-of-words model is a simplifying representation used in natural language processing and information retrieval (IR). In this model, a text (such as a sentence or a document) is represented as the bag (multiset) of its words, disregarding grammar and even word order but keeping multiplicity.

Deep learning is part of a broader family of machine learning methods based on learning data representations, as opposed to task-specific algorithms. Deep learning can be supervised, semi-supervised or unsupervised.

Elasticsearch is a search engine based on the Lucene library. Elasticsearch provides a distributed, multitenant-capable full-text search engine with an HTTP web interface and schema-free JSON documents.

First Notice of Loss (FNOL) can be the initial report made to an insurance provider following a loss, theft and/or damage of an insured asset. The FNOL can be an early step in a formal claims process lifecycle.

Gradient boosting (GBM) is a machine learning technique for regression and classification problems, which produces a prediction model in the form of an ensemble of weak prediction models, typically decision trees. GBM builds the model in a stage-wise fashion like other boosting methods do, and it generalizes them by allowing optimization of an arbitrary differentiable loss function.

Graph database (GDB) is a database that uses graph structures for semantic queries with nodes, edges, and properties to represent and store data. A key concept of the system is the graph. The graph relates the data items in the store to a collection of nodes and edges, the edges representing the relationships between the nodes. The relationships allow data in the store to be linked together directly and, in many cases, retrieved with one operation. Graph databases hold the relationships between data as a priority. Querying relationships is fast because they are perpetually stored in the database. Relationships can be intuitively visualized using graph databases, making them useful for heavily inter-connected data.

K-means clustering is a method of vector quantization that can be used for cluster analysis in data mining. K-means clustering can partition n observations into k clusters in which each observation belongs to the cluster with the nearest mean, serving as a prototype of the cluster.

MapReduce is a programming model and an associated implementation for processing and generating big data sets with a parallel, distributed algorithm on a cluster.

N-gram is a contiguous sequence of n items from a given sample of text or speech. The items can be phonemes, syllables, letters, words, or base pairs according to the application. The n-grams typically are collected from a text or speech corpus.

Ontology encompasses a representation, formal naming, and definition of the categories, properties, and relations between the concepts, data, and entities that substantiate one, many, or all domains of discourse. An ontology can be a way of showing the properties of a subject area and how they are related, by defining a set of concepts and categories that represent the subject.

Principal component analysis (PCA) is a statistical procedure that uses an orthogonal transformation to convert a set of observations of possibly correlated variables into a set of values of linearly uncorrelated variables called principal components.

Reinforcement learning (RL) is an area of machine learning concerned with how software agents ought to take actions in an environment so as to maximize some notion of cumulative reward.

Recurrent neural network (RNN) is a class of artificial neural network where connections between nodes form a directed graph along a sequence.

Regular expression is a sequence of characters that define a search pattern.

Sentence boundary disambiguation (SBD), also known as sentence breaking, sentence boundary detection, or sentence segmentation, is the problem in natural language processing of deciding where sentences begin and end. Natural language processing tools often require their input to be divided into sentences.

Supervised learning is the machine learning task of learning a function that maps an input to an output based on example input-output pairs. It infers a function from labeled training data consisting of a set of training examples. In supervised learning, each example is a pair consisting of an input object (e.g., a vector) and a desired output value (e.g., a supervisory signal). A supervised learning algorithm analyzes the training data and produces an inferred function, which can be used for mapping new examples.

Support-vector machines (SVMs) are supervised learning models with associated learning algorithms that analyze data used for classification and regression analysis. Given a set of training examples, each marked as belonging to one or the other of two categories, an SVM training algorithm builds a model that assigns new examples to one category or the other, making it a non-probabilistic binary linear classifier. An SVM model is a representation of the examples as points in space, mapped so that the examples of the separate categories are divided by a clear gap that is as wide as possible. New examples are then mapped into that same space and predicted to belong to a category based on which side of the gap they fall.

Taxonomy is the practice and science of categorization or classification. A taxonomy (e.g., a taxonomical classification) can be a scheme of classification (e.g., a hierarchical classification) in which things are organized into groups or types. A taxonomy can be used to organize and index knowledge (e.g., stored as documents, articles, or videos).

Term frequency-inverse document frequency (TF-IDF) is a numerical statistic that is intended to reflect how important a word is to a document in a collection or corpus. TF-IDF can be used as a weighting factor in searches of information retrieval, text mining, and user modeling. The TF-IDF value increases proportionally to the number of times a word appears in the document and is offset by the number of documents in the corpus that contain the word, which helps to adjust for the fact that some words appear more frequently in general.

Unsupervised learning is a branch of machine learning that learns from test data that has not been labeled, classified, or categorized. Instead of responding to feedback, unsupervised learning identifies commonalities in the data and reacts based on the presence or absence of such commonalities in each new piece of data.

Virtual assistant (e.g., a "chatbot") can be a software agent that can perform tasks or services for an individual. Virtual assistant can be accessed by online chat channels, an application interface, and the like. A virtual assistant can interpret human speech and respond (e.g., via text or synthesized voice).

Word2vec is a group of related models that are used to produce word embeddings. These models are shallow, two-layer neural networks that are trained to reconstruct linguistic contexts of words. Word2vec takes as its input a large corpus of text and produces a vector space, typically of several hundred dimensions, with each unique word in the corpus being assigned a corresponding vector in the space. Word vectors are positioned in the vector space such that words that share common contexts in the corpus are located close to one another in the vector space.

Problem Statement

Disclosed herein are systems and corresponding methods for improved natural language processing of structured and unstructured data with insights extraction. The systems and corresponding methods solve the following problem: Given (1) a document text that can be several paragraphs long (e.g., an insurance claim notes), (2) a set of several actions that an end user(s) (e.g., an insurance claims adjuster) can take, and (3) an end goal that the end user is trying to achieve (e.g., maximize or minimize a cost function). The system and corresponding methods address situations in which (A) a corpus of documents contain information (in unstructured text format) that includes (i) what actions have been taken so far (and what have not), (ii) other information which forms the basis upon which the end user(s) would take their actions, and (iii) all information needed to decide on the best course of action at each step that will get one closer to the end goal; (B) the actions taken by the end user(s) directly impact progress towards the end goal; and (C) any external events that are material to the decision on the actions and/or impact the end goal are documented in the document. The system executes to identify the set of key actions (to be taken by the end user), and makes those actions known to the end user in the form of recommendations, suggestions, and questions to be answered by the end user. Thus, the system is configured to recommend to the end user, actions that will help the end user work most effectively towards an end goal.

As an example, in the context of the domain of insurance claims, the end goal(s) could be: *Minimize the indemnity payment on an insurance claim *Minimize the time taken to close an insurance claim *Collect as much relevant information as possible early on during an insurance claims process. While the end goal(s) will be specific to the domain, the systems, methods, and techniques disclosed herein are applicable to any domain for which the above problem statement is relevant. Addressing the above requires certain tasks to be performed: 1. Process the unstructured text to identify the scenario context 2. Based on the scenario, come up with a list of actions that are relevant given the context 3. Detect which of those actions have already been performed, and which are ones that can be performed now (next actions) 4. Prioritize the list of next actions 5. Provide a recommendation to the end user(s), along with a context for why the recommendation One possible approach to solving the above stated problem is to use an expert system. Such an expert system may be configured with expert-configured rules; however, the expert system is configured to new rules and automatically update its knowledge base using machine learning techniques. Knowledge representation techniques in the expert system are enhanced to include domain specific hierarchical machine-learning models, domain-specific timeline-based patterns such as claim patterns, and answer patterns for each question. The expert system is enhanced to have a natural language processing (NLP) engine, a machine-learning engine, and a rules engine. In the example use case of providing recommendations for insurance claims processing where the actions taken by the end user are in the form of questions to ask the insured/claimant, the NLP engine searches for words/phrases (e.g. expert-configured as well as learned) in claim notes and uses NLP-based semantic context to determine whether a question has been asked and answered. The rules engine then applies rules to determine unanswered questions for recommendation to the end user. The rules engine may be further enhanced to include a question prioritization module, which uses a combination of machine-learning, statistical techniques, and expert rules to score and prioritize questions for recommendation to the end user. The rules engine also may be enhanced by using a question scoring and prioritization taken from previous steps along with other factors to recalculate a final score, making the rules engine recursive. Accordingly, the system is configured to provide a filtered list of unanswered recommendations/questions, along with a score and a context for each recommendation/question.

Example Methods of Natural Language Processing with Insights Extraction

FIG. 1 illustrates example computer-implemented process 100 that includes use of an artificial intelligence (AI) assistant/bot, and/or other AI devices in an insurance claim analysis, including in a First Notice of Loss (FNOL) phase of the claim analysis. However, process 100 may be used in other phases of an insurance claim analysis. Process 100 may be executed by example processor 2402 of FIG. 24. In the FNOL phase, various data about the claim are gathered in order to further investigate the insurance claim. An insurance claims adjuster or other claims representative may track resolution of the insurance claim, and through the process 100, may be provided with insights, recommendations, and suggestions, and may be notified of various alerts related to the insurance claim. The example process 100 may use natural language processing-based computing to provide the claims adjustor with the insights, suggestions, notifications, and recommendations from unstructured data.

The insurance claims adjustor may handle a variety of claims, and may "ask various questions" in order to determine whether an insurance claim is genuine (i.e., not fraudulent). However, the insurance industry does not have a standardized question set or process for resolving insurance claims. Furthermore, inexperienced claims adjustors may miss asking correct or sufficient questions or may not ask all the correct questions appropriate for a particular claim. These miscues may lead to costly lapses in the claim resolution process including insufficient documentation. Such lapses may on the one hand, particularly for claims denied by the insurance company, lead to a claim being contested in court if the insurance company were to deny the claim. On the other hand, this miscue scenario may lead to claimant fraud/misrepresentation going undetected with the result that fraudulent claims are paid, thereby increasing overall claim resolution costs.

Figure 24:
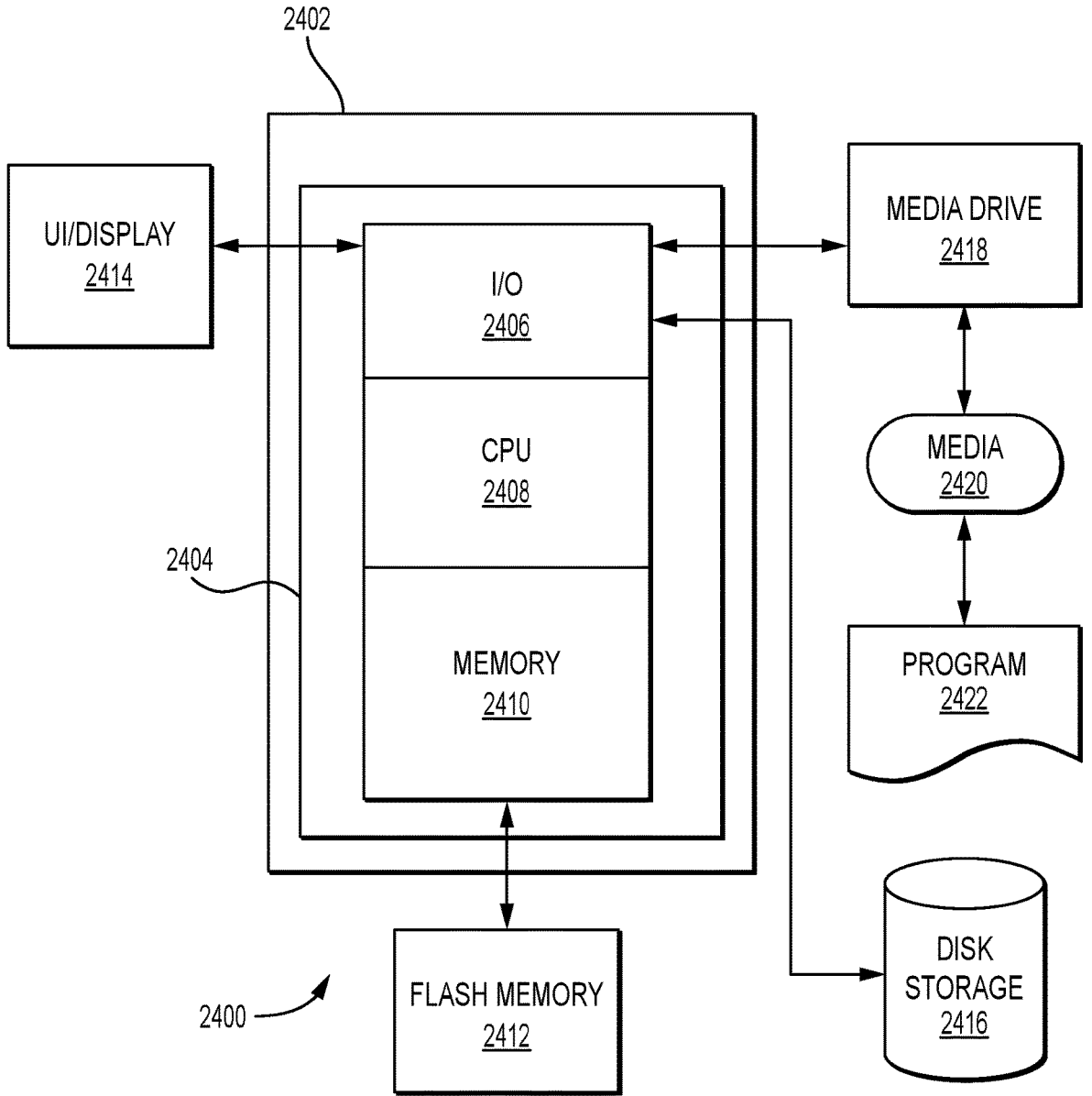
FIG. 24 depicts an example computing system that can be configured to perform any one of the processes disclosed herein.

In FIG. 1, processor 2402 of FIG. 24 may execute process 100 to provide a distributed database. More specifically, in step 102, process 100 analyzes claim notes and other claim data to identify the nature and details of the insurance claim and to generate a set of questions that the claims adjustor should seek to have asked and answered during claim resolution. In an aspect, the questions then may be "asked and answered" by the processor 2402 executing the process 100. For example, the processor 2402 may access a set of questions appropriate for the insurance claim, apply the questions (e.g., as a search) to a corpus of unstructured data documents, and receive answers in return. In a further aspect, the answers may be provided to the claims adjustor as alerts. In another aspect, the processor 2402 may provide the questions to the claims adjustor as recommended or suggested questions to ask and answer. In yet another aspect, the claims adjustor may formulate and answer questions, and those questions and answers may be analyzed as part of the process 100. Since the claim file may include large amounts of unstructured data, the processor 2402 may employ one or more of the herein disclosed routines to derive insights and intents from the claim file. In step 104, process 100 may execute to determine which of the identified questions (identified by either claims adjustor or processor 2402) already were answered and then suggest the unanswered questions to the claims adjustor to ask/answer. In step 106, process 100 may provide context on the reason for the recommended questions for a given claim to the claims adjustor. In step 108, processor 2402 may execute process 100 to learn and adapt in response to industry trends and/or approaches taken by fraudulent claimants.

FIG. 2 illustrates an example process 200 for implementing an expert system. Process 200 may be executed to implement suggestions, recommendations, and alerts. Process 20 also may be executed to enable context extraction. Process 200 may be i executed along with implementing an expert system, such as expert system 316 of FIG. 3.

In step 202, processor 2402 executes process 200 to generate/provide an expert system database of suggestions, recommendations, and alerts along with related words and phrases that may be drafted by a claim adjuster or other experienced insurance professional, based on the drafter's expert experience; the suggestions, recommendations, and alerts then may be configured by processor 2402 in the expert system database. For each suggested or recommended question, and for each alert, the expert system may be configured with the lines of businesses (LOBs) that the question applies to along with NLP-based triggers on when to ask the question. Processor 2402 may execute process 200 to provide NLP-based exceptions on when to ask or when not to ask the question. Processor 2402 may execute process 200 to generate NLP-based rules on how to detect if the question has already been asked/answered.

In step 204, the processor 2402 indexes the claim notes into a text-based document store database (e.g., SOLR or ELASTICSEARCH). As the data are loaded, is the data are manipulated in specified ways that may include, inter alia: stemming, stop-words filtering with a domain-specific stop-word list, and term expansion based on a domain-specific dictionary. In step 206, processor 2042 executes process 200 to search for the phrases and obtain snippets from the claim notes. In step 208, processor 2402 executes process 200 to apply domain specific NLP models for context and semantic interpretation of the phrases so as to confirm the context and the semantic interpretation serve the intent of an expert rule. In an example, only phrases that align with the intent are kept and other phrases are discarded. Processor 2402 may execute process 200 to implement techniques such as, inter alia: regular-expression, word-vectorization, and topic extraction.

In step 210, processor 2402 executes process 200 to combine phrases in order to determine triggers, exceptions, and answer-detection for the questions applicable to each claim. Process 200 may be executed to implement AND/OR rules based on expert system knowledge. Process 200 may be executed to implement NLP analysis rules. Process 200 may be executed to implement a scoring and statistical model.

In step 212, based on the outputs of the previous steps, the expert system provides suggestions for the claim. In step 214, processor 2402 executes process 200 to provide phrases and NLP snippets extracted to help provide context. In an aspect, a separate context extractor may be used to "tune" the context. Here, "tune" means to ensure the extracted NLP snippets contain context that is most relevant to the use case so as to provide actionable information to the end user (e.g., a claims adjuster). The tuning begins by obtaining a set of candidate contexts from the extracted snippets. Next, the "context extractor" scores each of the extracted contexts using a mix of techniques—(1) based on the timeline (e.g. in some use cases, the most recent context is more relevant; in other use cases the context found at the earlier point in time may be more relevant), (2) using a large language model based classifier to semantically group similar sentences (e.g. sentences that provide the same information) —the content extractor then clusters the semantically similar sentences and keeps only the ones with highest correlation to the question being addressed, (3) using a machine learning model that has been previously trained using supervised learning towards the end goal to score the contexts. The content extractor then combines the scores using use-case and question specific priority rules and comes up with the final score, keeping the contexts that have the highest final score. These and other aspects of context tuning are disclosed herein, including use of weights to bias the outputs and various aspects of machine learning.

Machine Learning Systems and Processes

Systems/processes 300-1400 may include machine-learning modules/routines. In an example, machine-learning includes a combination of supervised, unsupervised and reinforcement machine-learning techniques that may be used to generate various recommendations and suggestions, and to ask and answer questions.

In supervised learning, a corpus of claim notes and other claim documents at the first notice of loss (FNOL) stage first may be converted to text using, for example, optical character recognition (OCR) techniques. The corpus of claim notes and other claim documents then may be appended to the structured data for the claim. The corpus of claim notes and other claim documents then may be annotated or tagged by a human expert with a list of suggestions and alerts for each claim. The human expert also may annotate each suggestion with context keywords and phrases for that suggestion. In addition, various transformations can be performed on the claim document's text and annotations, such as, inter alia: stemming, join-word merging, stop-word filtering, synonym-extraction and filtering, and bag of words conversion. Each annotated claim document also may be converted to a string of tokens. Further transformations, such as word-vectorization, may be performed on these tokens to convert the claim document to a time series of vectors or tensors. This vector/tensor time series (along with the claim's structured data) then may be input to a machine learning model.

Machine-learning models (such as, inter alia: deep learning RNN, SVM, GBM) may be trained with the annotated data to be able to predict suggestions, along with their context, based on claim notes at the FNOL stage. Additionally, a machine-learning model may be instrumented to provide context data as one of the model's outputs. Accordingly, the machine-learning models may be tweaked to learn and provide context information along with suggestions. Here, "tweaked" means modifying the final layer in the model architecture to output a context associated with the suggestion. In addition, an expert system-based context extractor can be used to tune the context.

Unsupervised learning models may be provided and various unsupervised learning techniques may be used. Example unsupervised learning techniques may include, inter alia:

clustering, topic extraction, and frequent pattern mining, and combinations thereof, may be used to extract features and rules, and cluster similar claims together.

Claim notes and other claim documents can be first converted to text using OCR. Various transformations are performed on the resulting text, such as, inter alia: stemming, join-word merging, stop-word filtering, synonym-extraction and filtering, and bag of words conversion. These transformations convert each claim document into a string of tokens. The string of tokens then are indexed to create dictionaries for various key concepts to be learned. Further transformation(s), such as word-vectorization may be performed on these tokens to convert the document to a time series of vectors or tensors. The vector/tensor time series, along with claims structured data may be input to a machine learning model.

The unsupervised learning model learns patterns of what follow-up phrases and suggestions to provide for various claims at the FNOL stage. The unsupervised learning model also may learn dictionaries of key concepts as well as synonyms. The unsupervised learning model may learn nuances of various claims adjusters and similarities and differences between or among the claim adjusters. Tuning weights may be used to either bias or un-bias the learnings and suggestions, as appropriate.

Reinforcement Learning also may be used. In an aspect, an end-user feedback loop is implemented in a user interface (not shown) of system 2400 of FIG. 24. Through the interface, an end user (e.g., claims adjuster/supervisor/expert) may provide feedback on the suggestions provided by an expert system that employs supervised or unsupervised machine learning. There may be various mechanisms used for the feedback. For example, the system may provide a user interface other than the end user where the end user can mark each recommendation and/or context as "good" or "bad" or "relevant" or "not relevant." Feedback such as "good" and "relevant" are considered positive feedback, whereas "bad" and "not relevant" are considered negative feedback. The end-user may provide a positive or negative feedback. Through reinforcement learning, a model learns patterns of when end users provide positive versus negative feedback, and accordingly tunes the system to provide more meaningful and targeted suggestions. "Tuning" is described above. Here, "tuning" has the additional meaning of adjusting the machine learning weights in an automated manner, starting from a set of base model weights. Here, tuning also includes adjusting the weights in the scoring rules for scoring candidate context sin coming up with the final context. Reinforcement learning can be used as a layer on top of an expert system and other machine learning to fine tune the suggestions and to remove noise. Through this process, reinforcement training may add a "good" bias.

Additionally, reinforcement machine learning feeds back into the expert system to refine the NLP models and enhance expert system rules. Multiple processes can be run in parallel (e.g., map-reduce techniques) to shorten processing time.

FIGS. 3-6 illustrate example systems 300-600 for generating suggestions, alerts, and context extraction in an insurance claims.

Figure 3:
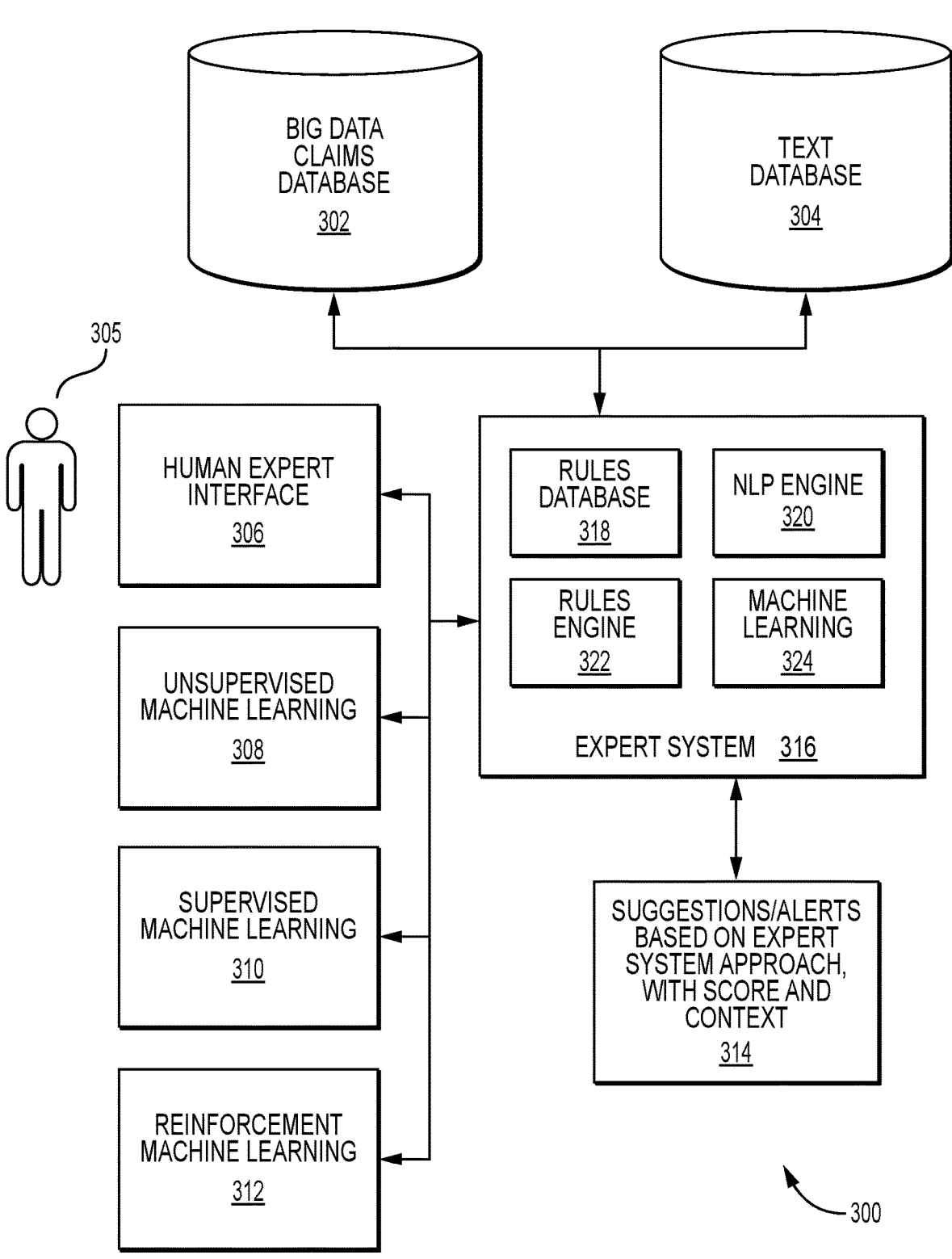
FIG. 3 illustrates an example system for generating suggestions/alerts based on expert system approach, with score and context.

FIG. 3 illustrates an example system 300 for generating suggestions/alerts based on an expert system approach, with score and context. System 300 includes a big data claims database 302 (e.g., an HBASE). Big data claims database 302 may include both structured data and unstructured data in the form of, for example, claim notes and other documents. System 300 includes a text database 304 (e.g., SOLR/ELASTICSEARCH). Text database 304 includes, inter alia: stop-word filtering; synonym filtering; stemming; indexing. System 300 utilizes a human expert interface 306 (e.g., a graphical user interface (GUI)). A human expert 305 may operate and receive information through the human expert interface 306. The human expert interface 306 may be operated to implement various actions, including, inter alia: configuring words/phrases and NLP models for claim signature detection. System 300 includes an unsupervised machine-learning module 308. The unsupervised machine-learning module 308 may learn new words/phrases; learn new claim patterns, questions; etc. System 300 includes supervised machine-learning module 310. Supervised machine-learning module 310 may refine words/phrases, implement NLP models, provide claim-patterns questions, for example. System 300 includes reinforcement machine-learning module 312. Reinforcement machine-learning module 312 may refine words/phrases, implement NLP models, and determine claim patterns, for example.

System 300 further includes expert system 316, which may be executed to provide suggestions/alerts based on an expert system approach, with score and context. Expert system 316 may configure: rules, triggers, exceptions and answers for suggestions and alerts. Expert system 316 may search for words/phrases (human expert-configured and machine-learned) in claim notes, and may provide NLP-based semantic context detection for claim signature detection. Expert system 316 may combine phrases into triggers and exceptions, score where appropriate, and detect patterns combining events, structured data, and time series. For example, phrases may be combined using the configured rules, and a hierarchy of rules may be applied in a specific rule sequence. Expert system 316 may make claim-specific suggestions and provide alerts based on the detected patterns. Expert system 316 may prioritize suggestions and alerts for recommendation to a claims adjustor of other personnel. Expert system 316 may include rules database 318, NLP engine 320, rules engine 322, and machine-learning engine 324.

Figure 4:
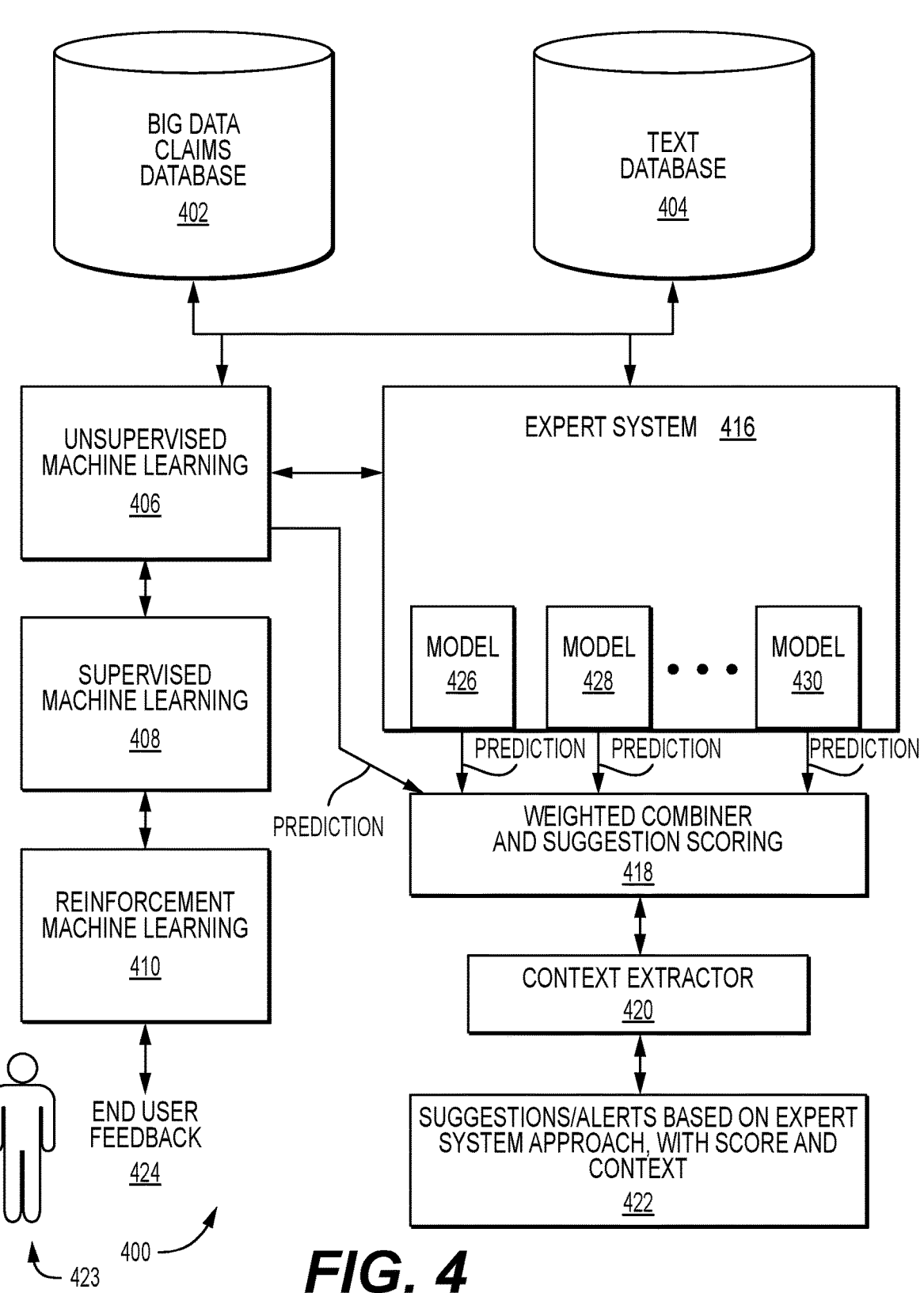
FIG. 4 illustrates an example system for recommended suggestions/alerts based on NLP machine-learning approach, with score and context.

FIG. 4 illustrates an example system 400 that generates suggestions and alerts based on an NLP machine-learning approach, with score and context. System 400 includes big data claims database (e.g., HBASE) 402. Big data claims database 402 includes both structured data and unstructured data of claim notes and other documents. System 400 includes time series vectors/tensors stored in text database 404. The time series vectors/tensors may include, inter alia: stop-word/join-word filtering; synonym expansion; stemming; bag of words transform; and word-vectorization. System 400 includes unsupervised machine-learning module 406. Unsupervised machine-learning module 406 implements various operations, such as, inter alia: clustering; topic extraction; frequent pattern mining to identify patterns and anomalies; and learn concept dictionaries.

Supervised machine-learning module 408 may execute to implement training of machine-learning models. Supervised machine-learning module 408 implements various operations, such as multiple machine-learning models based on structured/unstructured data. Each model scores suggestions/alerts, uses human expert data, and provides weighted tuning.

System 400 includes reinforcement machine-learning module 410. Reinforcement machine-learning module 410 refines words/phrases to use for machine-learning, and provides their weights. The reinforcement machine-learning module 410 may be used by human expert 423 to receive and provide end user feedback 424. An expert system 416 provides models 426-430 that interface with and implement a weighted combiner and suggestion scoring module 418. Context extractor 420 then extracts content such as top phrases used in prediction, topic extraction using NLP, for example. System 400 generates the recommended suggestions/alerts based on a natural language processing machine-learning approach, with score and context 422.

Figure 5:
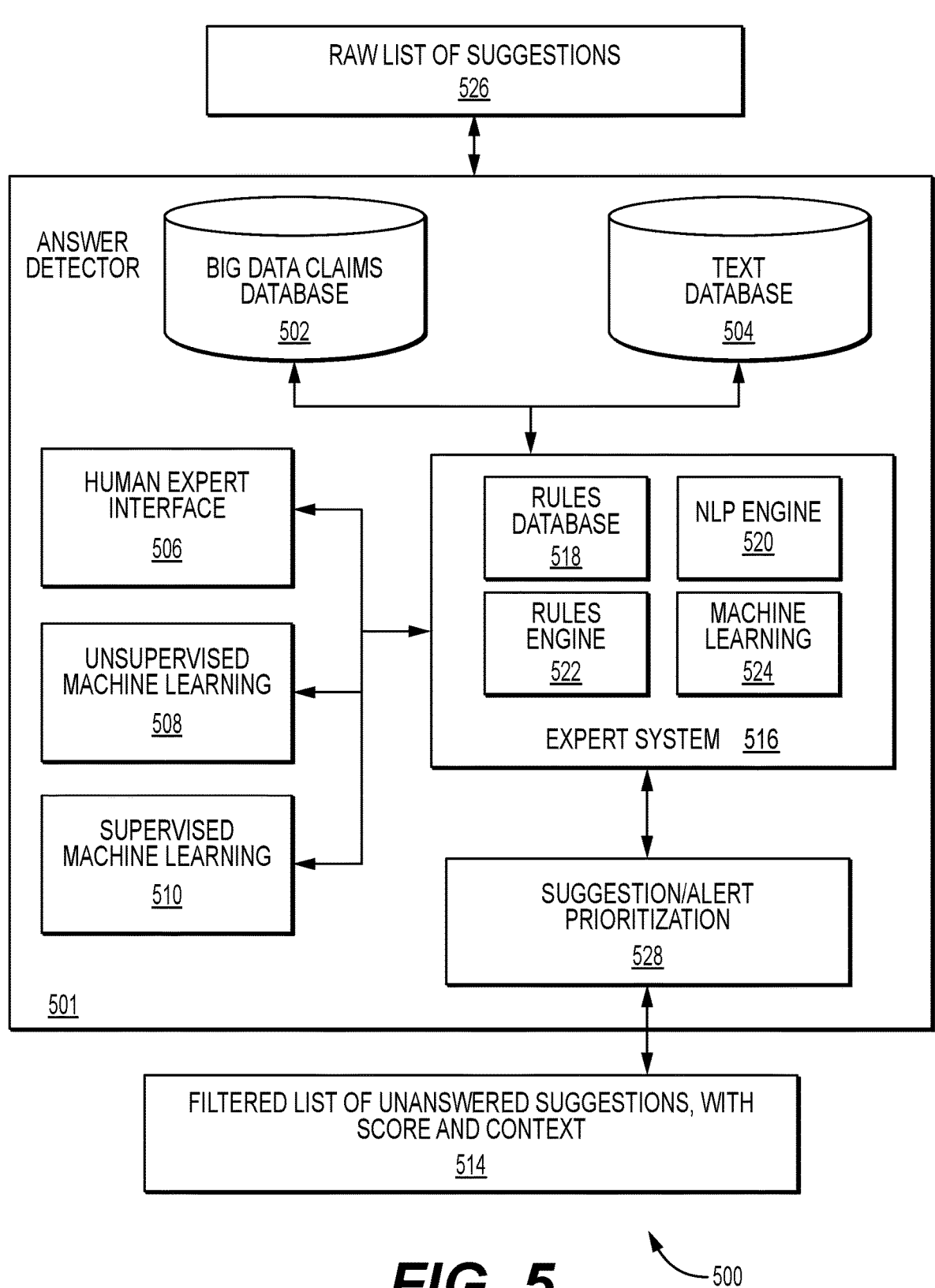
FIG. 5 illustrates an example system for generating a filtered list of unanswered suggestions, with score and context.

FIG. 5 illustrates an example answer system 500 for generating a filtered list 514 of unanswered questions/suggestions, with score and context, based on a received raw list of suggestions 526. System 500 includes an answer detector 501. Answer system 500 includes big data claims database 502 (e.g., an HBASE) of structured data and unstructured data such as, inter alia: claim notes and other documents. System 500 includes a text database 504 (e.g., SOLR/ELASTICSEARCH). Text database 504 includes, inter alia: stop-word filtering, synonym filtering, stemming, and indexing, for example. Human expert interface 506 may be used by a human expert (not shown) to configure words and phrases, and NLP models for claim signature detection and for answer detection. Unsupervised machine-learning module 508 may learn new rules and phrases. Supervised machine learning module 510 may refine words, phrases, NLP models, claims patterns, and answer patterns, for example.

Expert system 516 provides expert-configured and machine-learned rules, domain specific models, claim patterns, and answer patterns for each question. Expert system 516 is configured to search for words/phrases (e.g., expert-configured and learned) in claim notes and NLP-based semantic context-question has been answered; prioritized unanswered questions for recommendation. Expert system 516 is configured with the initial set and learns additional words, phrases and semantic searches that are used to score and determine whether a question has been answered, and prioritize the unanswered questions for recommendations. Expert system 516 includes rules database 518, NLP engine 520, rules engine 522, and machine-learning engine 524. Question/suggestion/alert prioritization module 528 provides a combination of machine-learning for statistical techniques; provides expert rules to score and prioritize questions; and uses score prioritization from previous steps as inputs along with other factors to recalculate a final score for each question. Accordingly, answer system 500 provides a filtered list 514 of unanswered questions/suggestions, with score and context.

Figure 6:
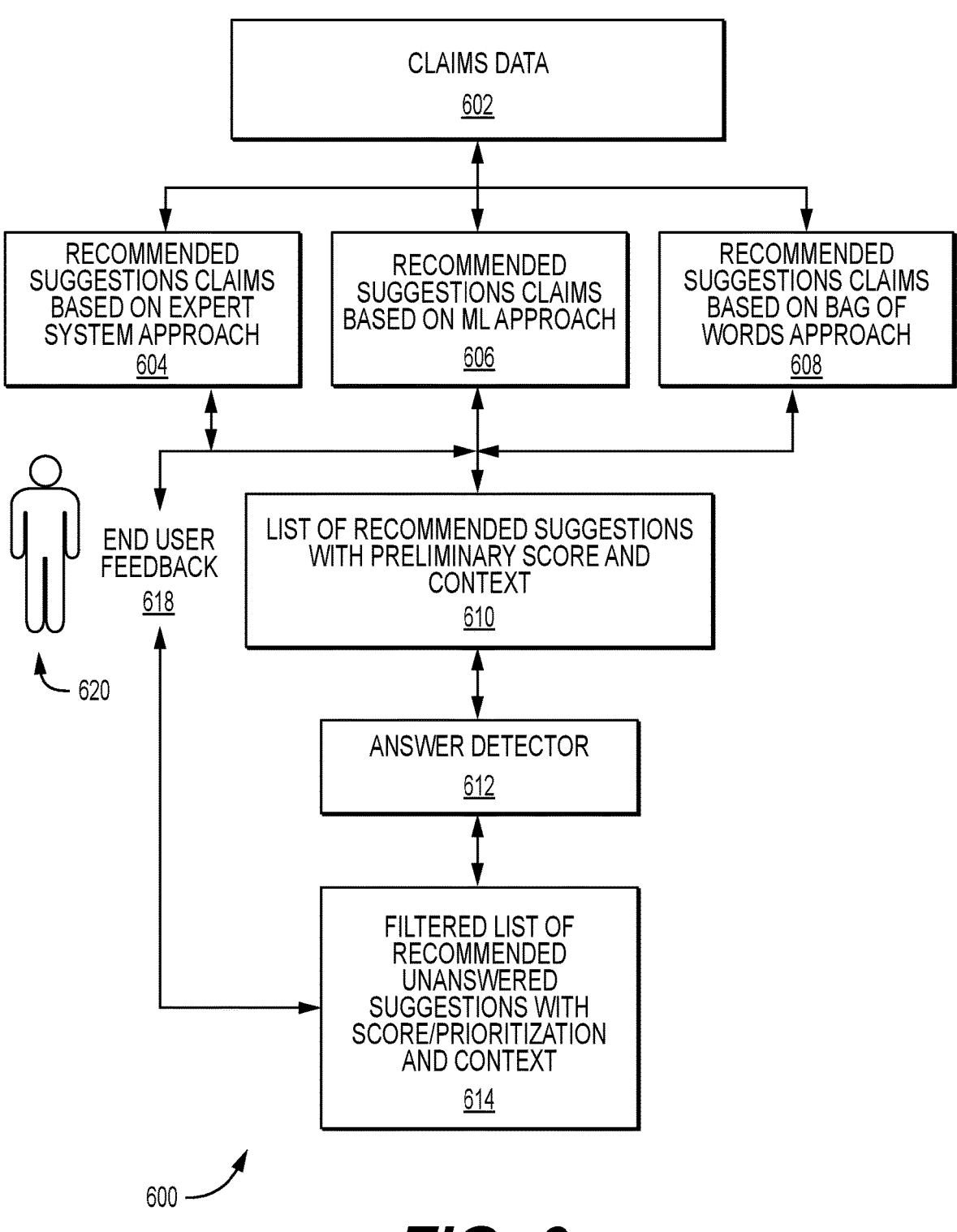
FIG. 6 illustrates an example process for generating a filtered list of recommended unanswered suggestions with score/prioritization and context.

FIG. 6 illustrates an example process 600 for generating a filtered list of recommended unanswered suggestions with score/prioritization and context. In step 602, process 600 obtains claims data. The claims data may include structured data and/or unstructured data (e.g., claim notes/other documents such as OCR text, for example). In step 604, process 600 may recommend or suggest questions for claims using an expert system approach. In step 606, process 600 may recommend or suggest questions for claims using a machine learning approach. In step 608, process 600 may recommend or suggest questions for claims using a bag of words approach. In step 610, process 600 may list recommended questions along with a preliminary score and a context for each question. In certain situations, some questions may have been answered. To account for answered questions, in step 612, process 600 may implement an answer detector. In step 614, process 600 may generate a filtered list of recommended unanswered questions along with a score/prioritization and a context for each unanswered question.

FIGS. 7-10 illustrate example systems 700-1000 for implementing claims investigation including a red-flags provision.

The systems 700-1000 each enable performance of a combination of steps for prediction and context extraction. The systems 700-1000 may include an expert system in which words and phrases are drafted based on expert experience and configured in an expert system database. The expert system may be configured with rules to detect red flag events and fraud schemes.

in the systems 700-1000, claim notes may be indexed into a text-based document store database. As the data are loaded, the data may be manipulated in certain ways such as stemming, stop-words filtering with a domain-specific stop-word list, and term expansion based on a domain-specific dictionary. The expert system may search for the phrases and obtain snippets from the claim notes containing the snippets. The expert system may perform NLP to implement context and semantic interpretation of the phrases to confirm whether the phrases serve the intent of the expert rule. Various phrases that align with the intent are kept and others are discarded.

The expert system may implement techniques such as, inter alia: regular-expression and topic extraction. The expert system may combine phrases to trigger events/red flags. Some of the events/red flags may be binary and/or others may have an associated score. For example, the expert system may apply Boolean (e.g., AND/OR) rules based on expert knowledge.

Systems 700-1000 may implement supervised machine-learning including coring and statistical modeling based a combination events to detect patterns. Based on any detected patterns, the expert system may predict whether a claim has any red flags or is potentially fraudulent. In an aspect, the expert system may be trained with recall as a goal; i.e., to reduce false negatives at the expense of more false positives. In a further aspect, the expert system may be tuned for maximum recall; i.e., with recall as the primary goal.

The expert system may implement entity extraction and link analysis. The expert system may extract entities and vehicles from claim notes and claim documents using NLP techniques. The expert system may look up entities in watch-lists and on social media to determine if any suspicious or high-risk entities are associated with the claim. The expert system may perform link analysis on claim entities, vehicles, etc. to detect organized activity. The expert system may provide red flags based on entity analysis/link analysis/social network analysis.

The expert system may implement other forms of machine learning. For example, The expert system may implement a combination of supervised, unsupervised, and reinforcement machine-learning techniques to come up with suggestions. When the expert system implements supervised learning, a corpus of claim notes and other claim documents at the FNOL stage first may be converted to text using optical character recognition (OCR) techniques. The text then may be appended to structured data for the claim. This is then annotated or tagged by expert system with a list of red flags and fraud schemes (where applicable) for each claim. A human expert may annotate each suggestion with context keywords and phrases for that suggestion. Various transformations are performed on the claim documents' text and annotations, such as, inter alia: stemming, join-word merging, stop-word filtering, synonym extraction and filtering, and bag of words conversion, for example. These transformations may convert each annotated claim document to a string of tokens. Further transformations (such as, inter alia, word-vectorization, etc.) may be performed on these tokens to convert the document to a time series of vectors or tensors. This vector/tensor time series (along with claims structured data) may be used as an input to a machine learning model.

Machine-learning models (such as deep learning RNN, SVM, GBM) are trained with the annotated data to be able to predict red flags, along with their context, based on claim notes at FNOL stage. Additionally, the machine-learning model is instrumented to provide context data as one of the outputs. In this way, machine-learning models may be modified to learn and provide context information along with suggestions. In addition, an expert system-based context extractor may be used to tune the context.

Unsupervised learning methods are now discussed. Unsupervised learning techniques (such as, inter alia: clustering, topic extraction, and frequent pattern mining, and various combinations thereof) are used to extract features and rules, and then, cluster similar claims together. Claim notes and other claim documents may first be converted to text using optical character recognition (OCR). Various transformations are performed on the resulting text, such as, inter alia: stemming, join-word merging, stop-word filtering, synonym-extraction and filtering, and bag of words conversion. These transformations convert claim documents into a string of tokens. These token strings then are indexed to create dictionaries for various key concepts to be learned. Further transformations (such as, inter alia, word-vectorization, etc.) are performed on these token strings to convert the document to a time series of vectors or tensors. The vector/tensor time series along with a claim's structured data is used as an input to a machine learning model. The unsupervised learning technique generate (i.e., learn) dictionaries of key concepts as well as synonyms. The unsupervised learning techniques also learn nuances and idiosyncrasies of various claims adjusters and similarities and differences among claims adjustors. The unsupervised learning techniques then use anomaly detection techniques to generate red flags.

Reinforcement learning methods are now discussed. An end-user feedback loop may be implemented in a human expert interface, and a human expert (e.g., a claims adjuster/ supervisor) may operate the human expert interface provide feedback on the suggestions provided by the expert system, and associated supervised or unsupervised machine learning models. The human expert may provide either positive or negative feedback. Through this feedback process, reinforcement learning models learn patterns of human expert-provided positive and negative feedback, and accordingly, the reinforcement machine learning tunes the expert system to provide more meaningful and targeted suggestions and red flags. in this way, reinforcement learning may be used as a layer on top of an expert system and other machine learning techniques to fine tune to suggestions and further to remove noise. Thus, the reinforcement machine learning provides a positive bias that enhances a customer's business process—that is, for example, the reinforcement machine learning enhances the claims adjustment process. Furthermore, the reinforcement machine learning feeds back into the expert system in order to refine NLP models and enhance expert system rules. Still further, multiple machine learning processes may be run in parallel to reduce overall processing time, and multiple cost estimator models may be added to the machine learning to accurately estimate the costs of claim settlements and resolutions.

Figure 7:
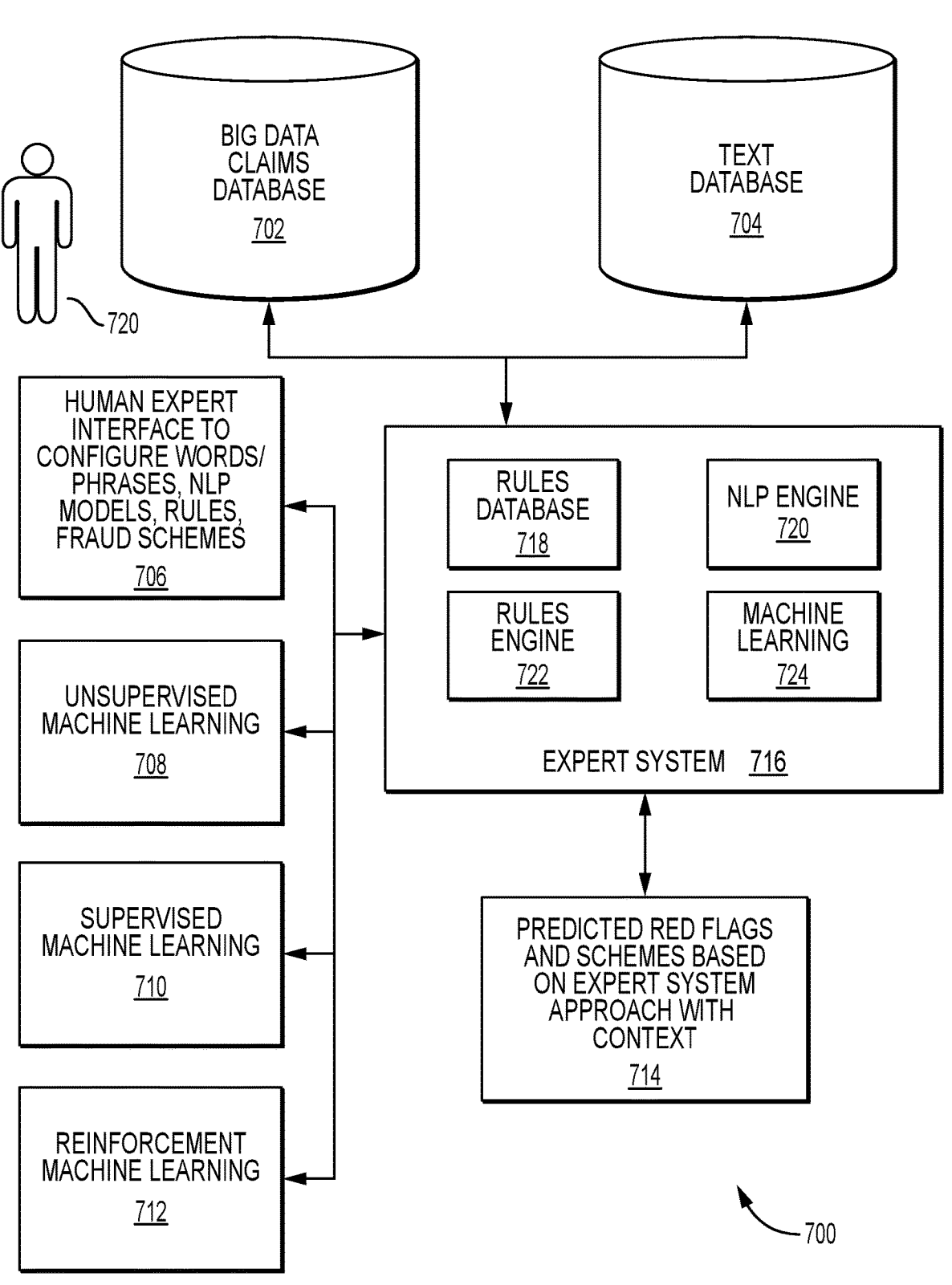
FIG. 7 illustrates an example system for predicted red flags and schemes based on expert system approach with and context.

FIG. 7 illustrates an example system 700 for predicting red flags and fraud schemes based on an expert system approach with context. in FIG. 7, big data claims database 702 may include structured data and/or unstructured data (e.g., claim notes other documents). Text database 704 may include stop-word filtering, synonym filtering, and stemming indexing. A human expert 720 may use interface 706 to configure words/phrases, NLP models, rules, and fraud schemes. Unsupervised machine-learning module 708 may learn new words/phrases and patterns. Supervised machine-learning module 710 may refine words/phrases and NLP models. Reinforcement machine-learning module 712 may refine words/phrases, NLP models, rules, and fraud models.

Expert system 716 may provide expert configured fraud models, red flag rules and domain specific NLP models. Expert system 716 may search for words/phrases (expert-configured and learned) in claim notes. Expert system 716 may use NLP-based semantic context-detection to ensure the snippets capture the intent of the human expert 720. Expert system 716 may combine phrases into events and red flags. Expert system 716 may score the events/red flags where appropriate. Expert system 716 may combine events, along with structured data and time series analysis, to detect patterns and to apply machine-learning to the patterns to predict various fraud schemes. Thus, system 700 generates predicted red flags and fraud schemes based on expert system approach with context 714.

Figure 8:
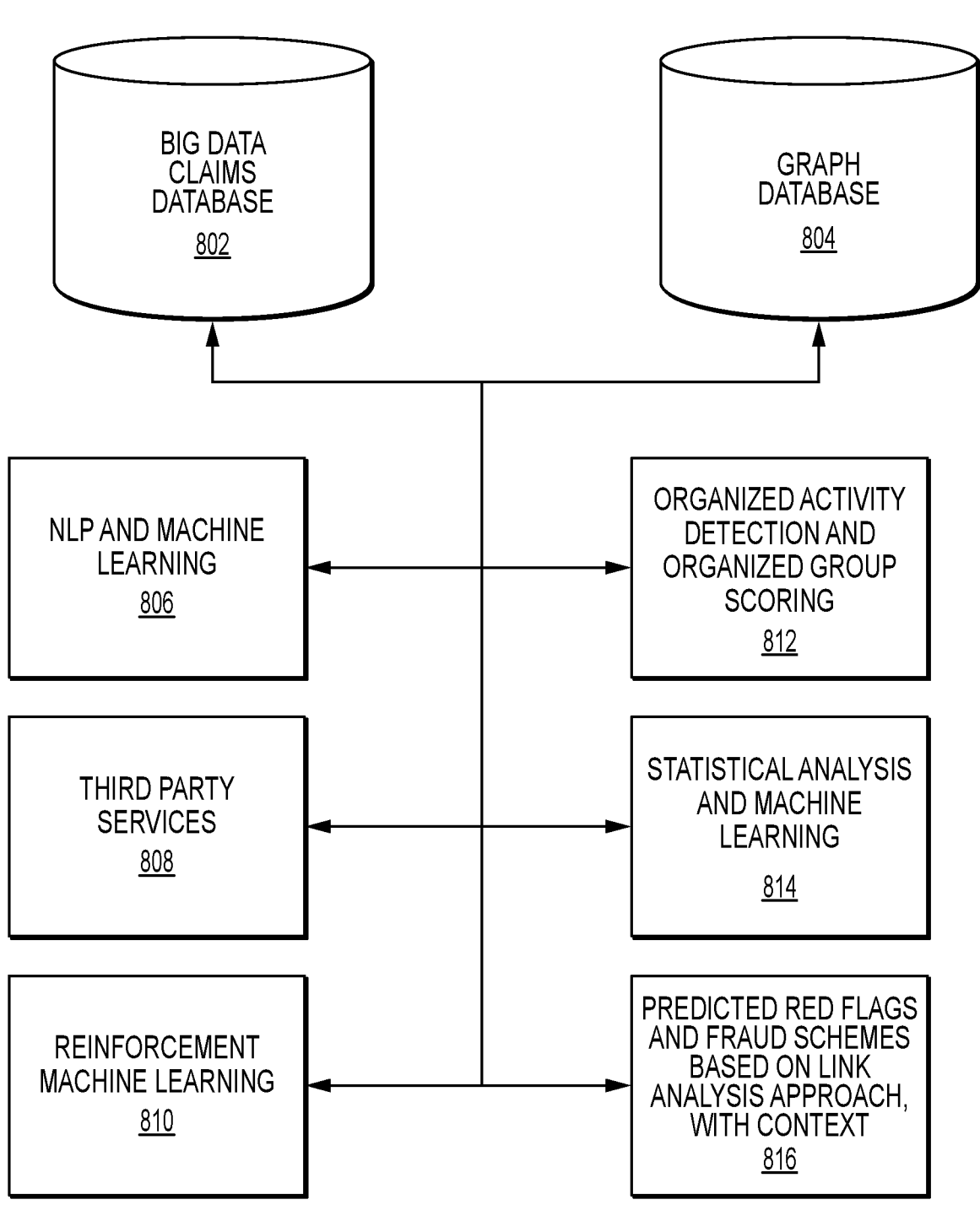
FIG. 8 illustrates an example system for generating litigation/settlement likely claims based on lawyer/AOB/suspect entity approach, with context.

FIG. 8 illustrates an example system 800 for generating litigation/settlement likely claims based on a lawyer/Assignment of Benefits (AOB)/suspect entity approach, with context. System 800 may include big data claims database 802. Big data claims database 802 may include structured data and/or unstructured data (e.g., claim notes, other documents, etc.). System 800 may include NLP and machine-learning module 806. NLP and machine-learning module 806 may provide named entity recognition and extraction; pattern-based entity recognition and extraction; and machine-learning based entity recognition and extraction. Third-party services 808 module may include, inter alia: (e.g., California Bar Association, NICB reports, etc.), and/or information about suspect entities (e.g., suspect lawyers, contractors, doctors).

System 800 may include reinforcement machine-learning module 810. Reinforcement machine-learning module 810 may refine entities' information and scores. System 800 may include organized group detection module 812 for organized activity detection and organized group scoring. System 800 may include statistical analysis and machine learning module 814. In addition to or as part of generating litigation/ settlement likely claims based on a lawyer/Assignment of Benefits (AOB)/suspect entity approach, with context, system 800 may generate predicted red flags and identify fraud schemes based on a link analysis approach, with context 816.

Figure 9:
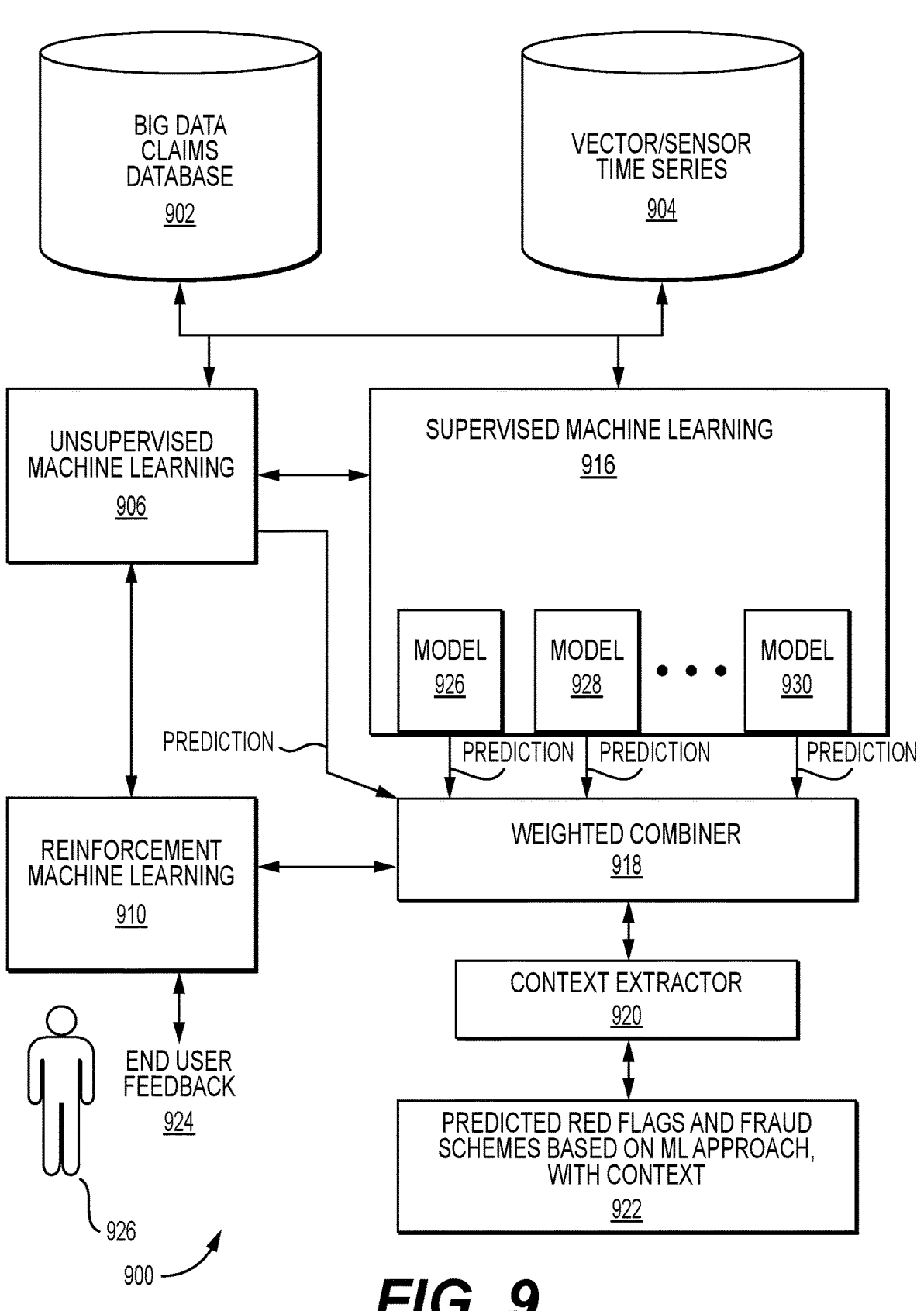
FIG. 9 illustrates an example system for generating predicted red flags and fraud schemes based on ML approach.

FIG. 9 illustrates an example system 900 for generating predicted red flags and identifying fraud schemes based on a machine learning approach. System 900 may include big data claims database 902. Big data claims database 902 may include structured data and/or unstructured data (e.g., claim notes and other documents). System 900 may include a vector/tensor time series database 904. Vector/tensor time series database 904 may include, inter alia: stop-word filtering; synonym filtering; stemming; n-gram filtering; word vectorization; topic extraction; and bag of words transform.

System 900 includes unsupervised machine-learning module 906. Unsupervised machine-learning module 906 may implement, inter alia: clustering; topic/concept extraction; frequent pattern mining; and may learn significant phrases, patterns, and concepts.

System 900 includes reinforcement machine-learning module 910. Reinforcement machine-learning module 910 may implement, inter alia. refinement of words/phrases to use for machine learning, and their weights.

System 900 includes supervised machine-learning module 916. Supervised machine-learning module 916 may create multiple machine learning models 926-930, which may generate relevant predictions. System 900 includes weighted combiner 918 and context extractor 920. Context extractor 920 may obtain, inter alia: top phrases used in prediction and topic extraction using NLP. System 900 may then a generate predicted red flags and identify fraud schemes based on a machine learning approach, with context.

Figure 10:
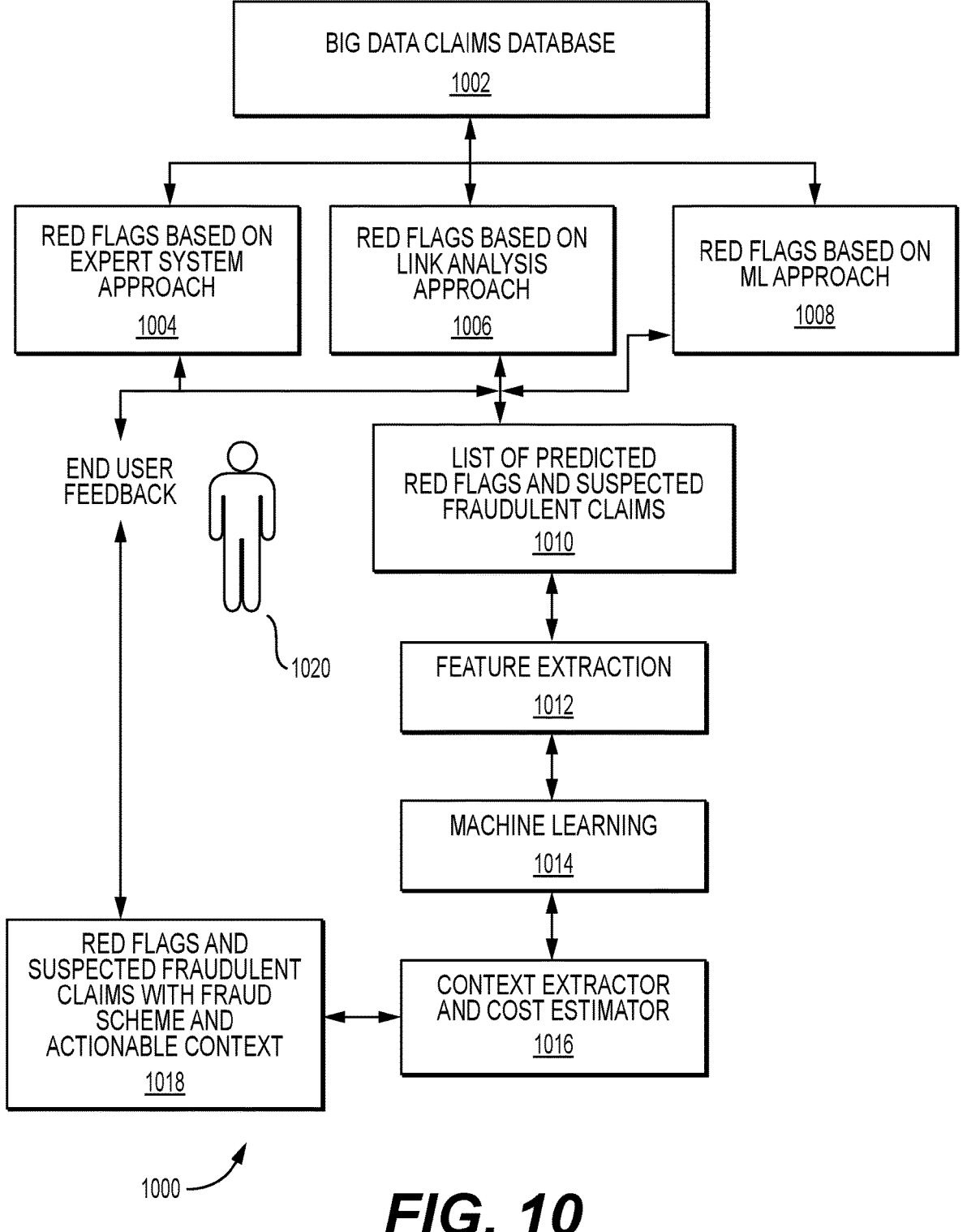
FIG. 10 illustrates an example system for generating red flags and suspected fraudulent claims with fraud scheme and actionable context.

FIG. 10 illustrates an example system 1000 for generating red flags and identifying suspected fraudulent claims with fraud schemes and actionable context. System 1000 includes big data claims database 1002. Big data claims database 1002 includes structured data and/or unstructured data (e.g., claim notes and other documents). In an aspect, the system 1000 may implement a red flags-based on expert system approach using module 1004. In another aspect, system 1000 may implement a red flags-based on link analysis approach using module 1006. In yet another aspect, system 1000 may implement a red flags-based on machine learning approach using module 1008. All of the approaches may use a list of predicted red flags and suspected fraudulent claims. List module 1010 may include structured data and/or unstructured data (e.g., claim notes and other documents). Feature extraction module 1012 module may be implemented and may include, inter alia: structured data columns (location, cause of loss, insured details, etc.); events, red flags, phrases from unstructured data; claim notes bag of words as time series; entities extracted from unstructured data; claim costs and historic claim costs; other features. Machine-learning module 1014 may be used for predictive modeling and claim scoring. Context extractor and cost estimator module 1016 may determine context using processes disclosed herein. Context extractor and cost estimator module 1016 may determine entity information and statistics. Context extractor and cost estimator module 1016 may implement an expert system based additional context. Context extractor and cost estimator module 1016 may implement statistical and traditional machine-learning-based cost estimation. System 1000 may generate red flags and suspected fraudulent claims with fraud schemes and actionable context using module 1018.

FIGS. 11-14 illustrates systems 1100-1400 for implementing claims litigation prediction. Systems 1100-1400 may include an expert system. Words and phrases are drafted based on human expert experience and configured in an expert system database. Claim notes are indexed into a text-based document store database (e.g., SOLR). As the data are loaded, the data are manipulated in certain ways such as, inter alia: stemming, stop-words filtering with a domain-specific stop-word list, and term expansion based on a domain-specific dictionary. The expert system may search for the phrases and obtain text snippets from the claim notes. The expert system may use natural language processing to perform context and semantic interpretation of the phrases to confirm whether the phrases serve the intent of one or more expert rules. Only phrases that align with the intent are kept and other phrases may be discarded.

The expert system may implement various techniques, such as regular-expression and topic extraction. The expert system may combine phrases to trigger events/red flags. Some of the events/red flags are binary, others may have a score associated with them. The expert system may implement AND/OR rules based on expert knowledge.

The expert system may implement supervised machine learning based on various factors. The expert system may implement scoring and statistical modeling. The expert system may combine events to detect patterns. Based on patterns seen, the expert system predicts the likelihood of a claim going into litigation. This may narrow down the relevant space. The expert system may be tuned for maximum recall.

The expert system may implement AOB and lawyer detection. The expert system may include a database of lawyers for look up. The expert system may search for terms such as "law firm", "attorney", "atty", etc. The expert system may provide phrases indicating an Assignment of Benefit (AOB). An AOB may be marked by a customer, in some cases.

The expert system may enable the scoring of lawyers in the database and predict litigation/settlement based on the scoring. In an aspect the expert system may merge expert system and AOB/Lawyer detection claims (e.g., to narrow the domain). The expert system may use augmentation techniques, such as entity disambiguation and entity classification algorithms to identify relevant entities for scoring. The expert system may add machine learning with multiple Bag-Of-Words (BOW) based models (e.g., SVM) and/or time series vector/tensor flow (e.g., RNN). The expert system may locate all claims having a particular phrase or set of phrases, that narrows the space, then train adding redundancy. These claims may be further broken down based on city/state, cause of loss, etc. Multiple processes may be run in parallel to shorten processing time. The expert system may determine and extract modified or new data in claim notes, that have been modified/added in the last few weeks and contain information about litigation or settlement. The expert system may convert these extracted textual data to BOW and time series vectors/tensors. The expert system may extract organizations and entities from claims. Entity scoring may be based on statistical analysis. The expert system may employ PCA to identify key organizations, events, and phrases based in a temporal tensor space leading to a litigation/settlement. The expert system may use train machine learning models based on these extracted items to predict litigation and/or settlement. The expert system may implement various classification, clustering, and anomaly detection operations. The extracted phrases may be used to determine context. Additionally, the expert system may add a separate context extractor. A set of phrases that are used to predict may be determined. The expert system may also determine phrases that may not be used to predict, but are found quite often in litigated claims and may indicate something actionable. Reinforcement machine learning provides positive/negative feedback on the predictions and is used to further tune the models and predictions. A cost estimator may be used to estimate claim costs.

Figure 11:
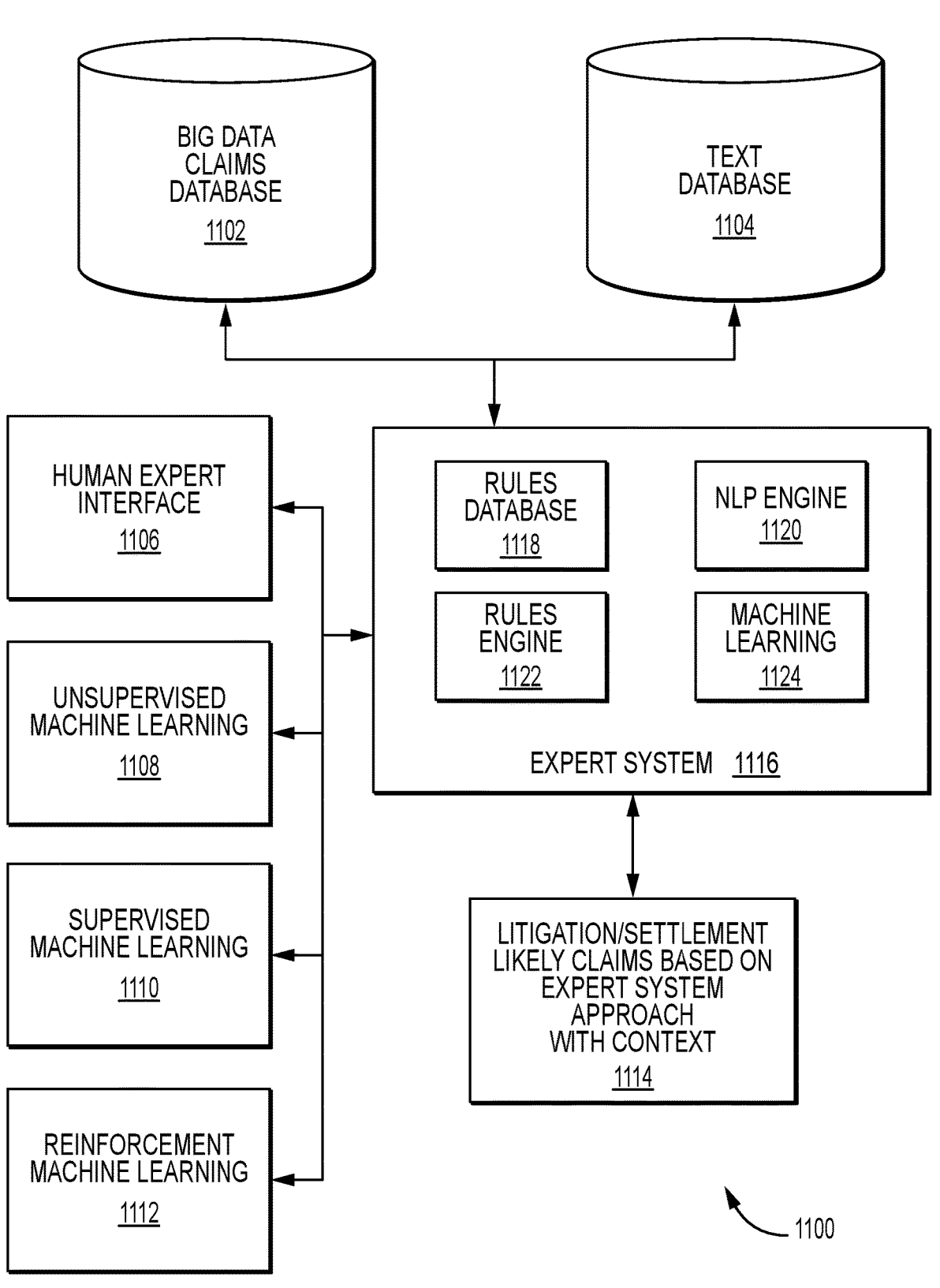
FIG. 11 illustrates an example system for determining litigation/settlement likely claims based on expert system approach with context.

FIG. 11 illustrates an example system 1100 for determining litigation/settlement likely claims based on expert system approach with context extraction. System 1100 may include big data claims database 1102. Big claims database 1102 may include structured data and/or unstructured data (e.g., claim notes and other documents). System 1100 may include text database 1104. Text database 1104 may include stop-word filtering, synonym filtering, stemming, indexing, topic extraction, and word vectorization. Human expert interface 1106 may be used to configure words/phrases, NLP models, and rules. Unsupervised machine-learning module 1108 may learn new words, patterns, and clusters. Supervised machine-learning module 1110 may refine predictions and score claims. Reinforcement machine-learning module 1112 may refine words, phrases, and NLP models. Expert system 1116 may provide human expert configured rules and domain specific NLP models for litigation/settlement prediction; search for words/phrases (expert-configured and learned) in claim notes; NLP-based semantic context-detection to ensure the snippets capture the intent of the human expert; combine phrases into events and red flags; score the events/red flags where appropriate; combine events, along with structured data and time series analysis, to detect patterns; and/or apply machine-learning on the patterns to predict litigation. Expert system 1116 may include a rules database 1118, an NLP engine 1120, a rules engine 1122 and a machine-learning engine 1124. System 1100 may generate litigation/settlement likely claims based on an expert system approach with context extraction.

Figure 12:
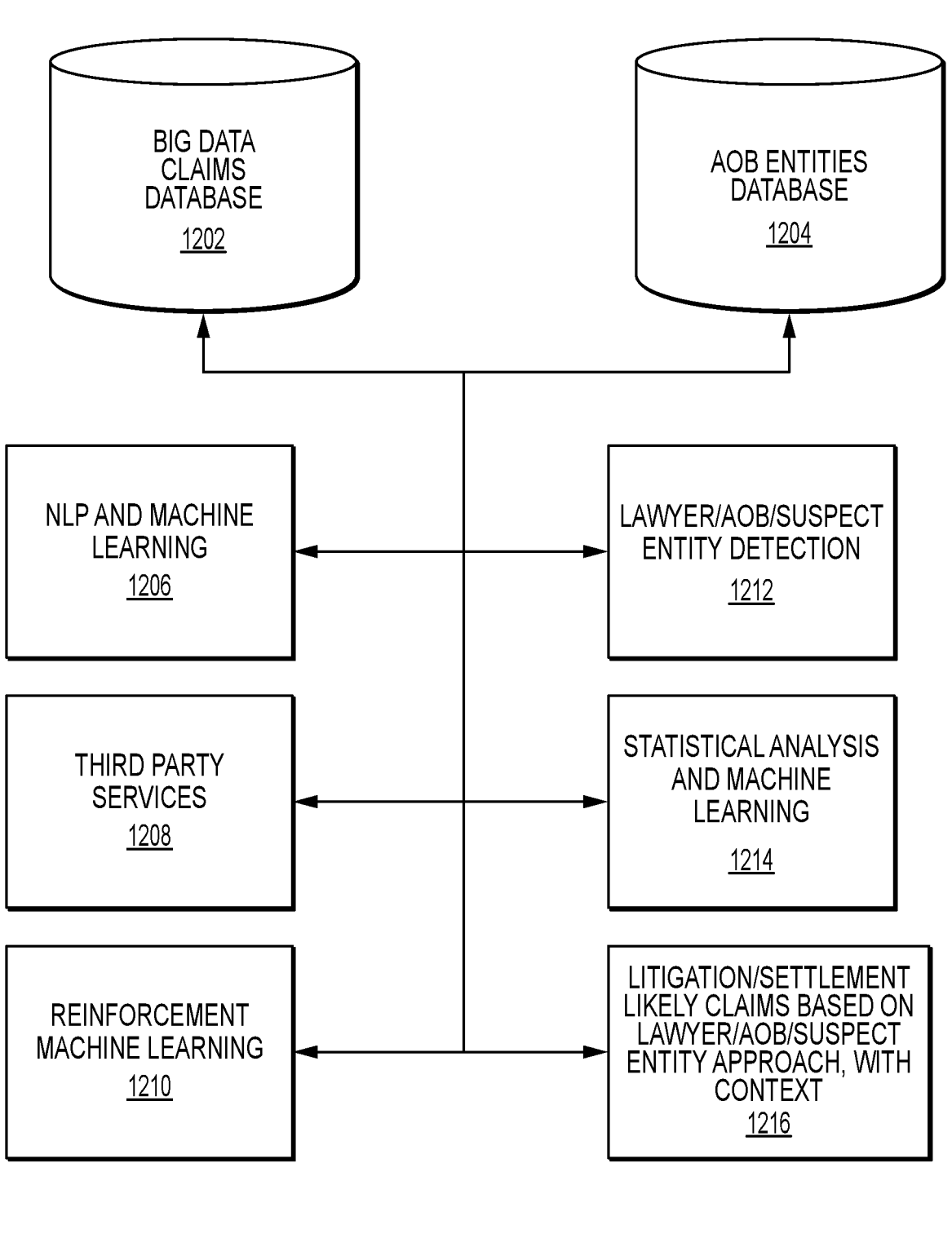
FIG. 12 illustrates an example system for generating litigation/settlement likely claims based on expert system approach with context.

FIG. 12 illustrates an example system 1200 for generating litigation/settlement likely claims based on an expert system approach with context extraction. System 1200 may include big data claims database 1202. Big data claims database 1202 may include structured data and unstructured data (e.g., claim notes other documents). System 1200 may include entity recognition modules and named entity recognition modules, and may store such entities in an entity/named entity database 1204, which also may include Assignment of Benefits (AOB). In an aspect, entries for Assignment of Benefits entities databases 1204 may include phrases indicating an AOB; other entities (e.g., generically-named entities such as lawyers/contractors/doctors/agents/organizations, and named entities (e.g., named lawyers, named organizations)) may be entered in database 1204 with statistics and scores indicative of litigation or settlement outcome likelihoods. NLP and machine-learning module 1206 may implement named entity extraction; pattern-based entity extraction; machine-learning based entity extraction; and semi-supervised machine-learning to learn phrases indicating an AOB. The system 1200 may include access to third-party services 1208 (e.g., California bar association, NICB reports), which may provide information about suspect entities (e.g., lawyers, contractors, doctors). Reinforcement machine-learning module 1210 may refine entities' information and scores. System 1200 may implement statistical analysis and machine learning module 1214, which may execute to analyze statistics and generate probabilities (e.g., scores) related to claim settlement or litigation based on the nature of the claim and the entities (claimant/insurer). For example, some named entities may show a statistically useful and relevant propensity, or pattern, to settle certain claim types but litigate others; settle claims based on dollar value; settle claims with certain classes of claimants and litigate claims with other classes of claimants; or any combination of these and other factors. Accordingly, the system 1200 may execute to generate litigation/settlement likely (with some confidence level) claims based on, for example, a lawyer/AOB/suspect entity (named or generic) approach, with context 1216.

Figure 13:
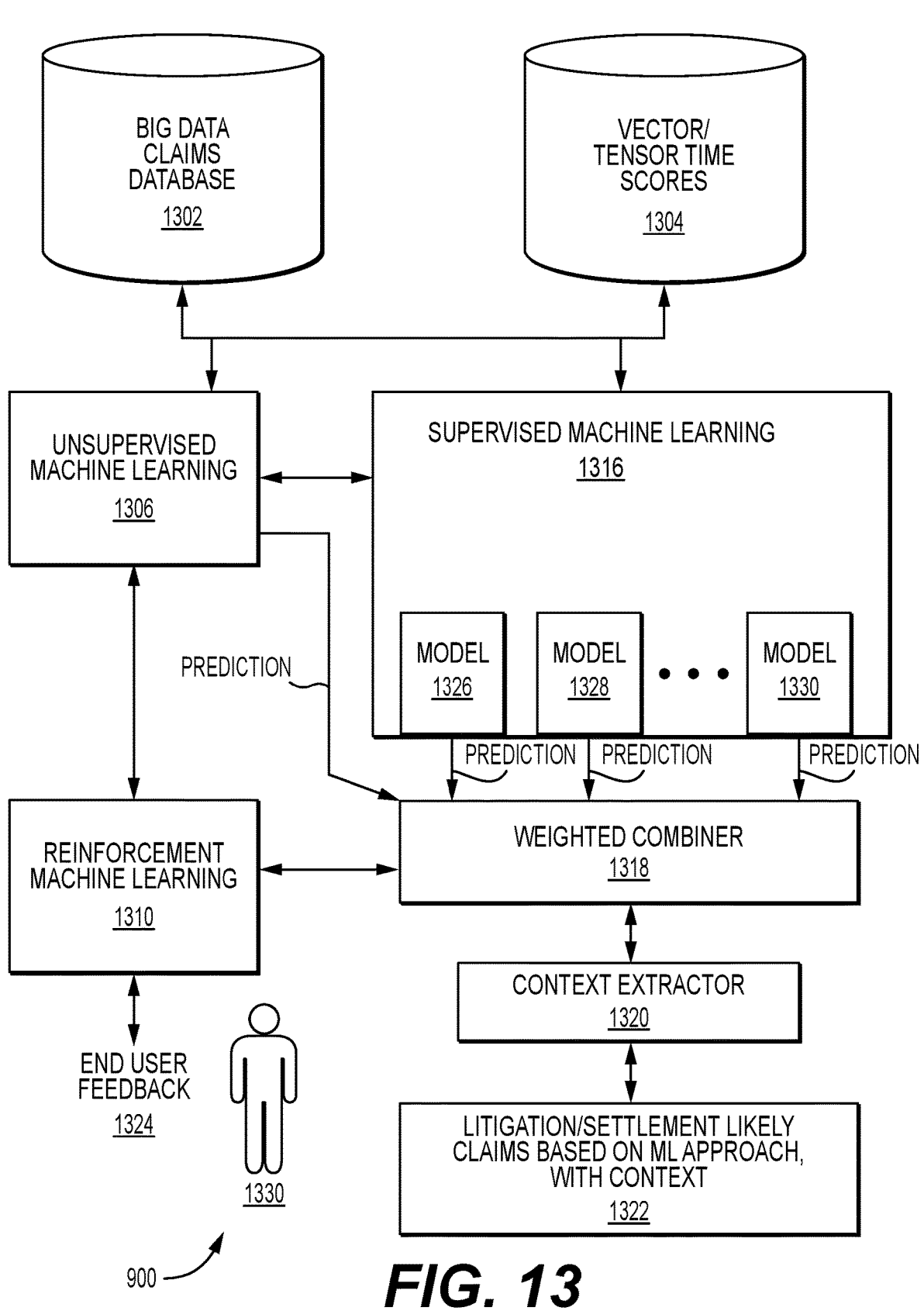
FIG. 13 illustrates an example system for generating litigation/settlement likely claims based on ML approach.

FIG. 13 illustrates an example system 1300 for generating litigation/settlement likely claims based on a machine learning approach. System 1300 includes big data claims database 1302. Big data claims database 1302 may include structured data and unstructured data (e.g., claim notes other documents). System 1300 may include a vector/tensor time series database 1204. Vector/tensor time series database 1204 may include or facilitate, inter alia: stop-word filtering, synonym filtering, stemming, n-gram filtering, topic extraction, word-vectorization, and bag of words analysis. System 1300 may include an unsupervised machine-learning module 1306. Unsupervised machine-learning module 1306 may implement/determine clustering, may execute frequent pattern mining, and may learn words, phrases and patterns that appear in a higher percentage of litigated/settled claims than in other claims. System 1300 may include a reinforcement machine-learning module 1310. Reinforcement machine-learning module 1310 may receive inputs (feedback 1324) from human expert 1330 and use those inputs to refine words/phrases and to determine various patterns to use for machine-learning and their weights. System 1300 may include supervised machine-learning module 1316. Supervised machine-learning module 1316 may create multiple ML models 1326-1330 used to make various predictions that then are fed to weighted combiner 1318. Context extractor 1320 may determine the top phrases (e.g., most frequently-used; associated with past most accurate predictions of settlement/litigation) to be used in future predictions and to implement accurate topic extraction using NLP. Accordingly, system 1300 may generate litigation/settlement likely claims based on ML approach, with context.

Figure 14:
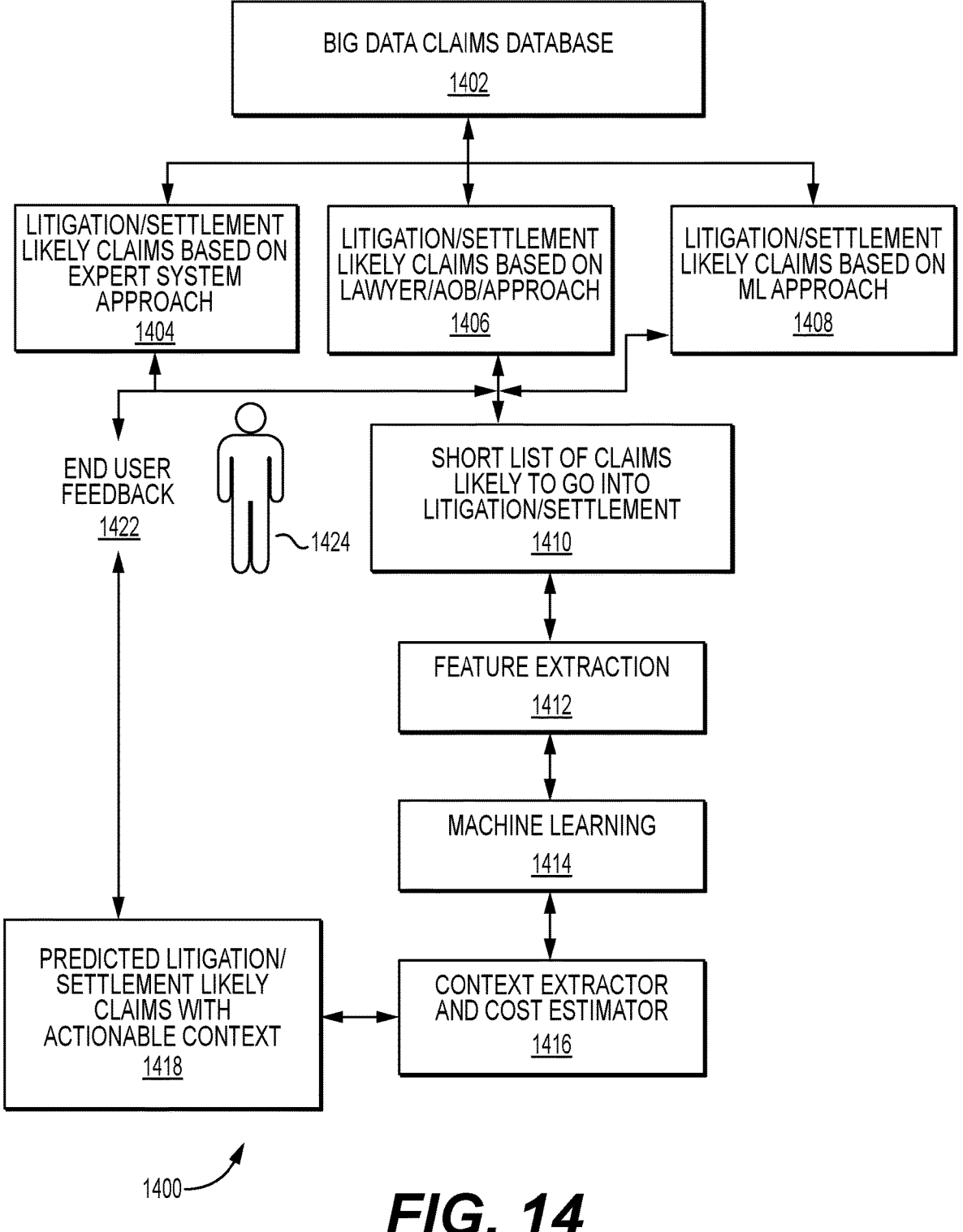
FIG. 14 illustrates an example system for generating predicted litigation/settlement likely claims with actionable context.

FIG. 14 illustrates an example system for generating predicted litigation/settlement likely claims with actionable context; i.e., context from claims data (e.g., claim notes and documents) that provides useful information for the end user (e.g., a claims adjuster) to take an appropriate action based on it. For example, based on the context, a claims adjuster may determine that it is best to reassign the claim to a more senior adjuster, or to make a quick settlement offer before the claim becomes more expensive. Big data claims database 1402 may include structured data and unstructured data (e.g., claim notes other documents). System 1400 may determine litigation/settlement likely claims based on expert system approach 1404. System 1400 may determine litigation/settlement likely claims based on lawyer/AOB approach 1406. System 1400 may determine litigation/settlement likely claims based on ML approach 1408. These three approaches are disclosed herein in more detail, including with respect to FIGS. 11-13. The three approaches 1404, 1406, and 1408 may generate a shortlist 1410 of claims that are likely to go into litigation/settlement, along with corresponding structured data unstructured data in the form of claim notes and other documents.

The system 1400 may include feature extraction module 1412. Feature extraction module 1412 may execute to determine, within structured, data columns (location, cause of loss, insured details, etc.); and within unstructured data, events, red flags, and phrases. The module 1412 also may extract last n-weeks' worth of claim notes as a bag of words or as a time series; entities extracted from unstructured data; claim costs and historic claim costs; and other features. Machine-learning module 1414 may implement predictive modeling and determine precision fine-tuning (for example to reduce false positives).

Context extractor and cost estimator 1416 may obtain the context from the above process of feature extraction module 1412. Context extractor and cost estimator 1416 may obtain/calculate entity information and statistics. Context extractor and cost estimator 1416 may determine an expert-system based additional context. Context extractor and cost estimator 1416 may implement statistical and traditional machine-learning based cost estimation. In this way, system 1400 may provide predicted litigation/settlement likely claims with actionable context 1418.

Creating and Summarizing Unstructured Natural Language Sentence Clusters for Efficient Tagging/Annotation A method and a corresponding apparatus for extracting insights from case files with large amounts of unstructured data are now discussed. The method may use a mechanism for reducing domain noise and creating and summarizing claim sentence clusters for efficient semantic tagging of case files such as insurance claims data. The method may use a mechanism for detecting base features based on semantic intent of tags and/or a hierarchical approach for combining the tagged features into insights. Optionally, the method may use a mechanism for scoring insights.

Figure 15:
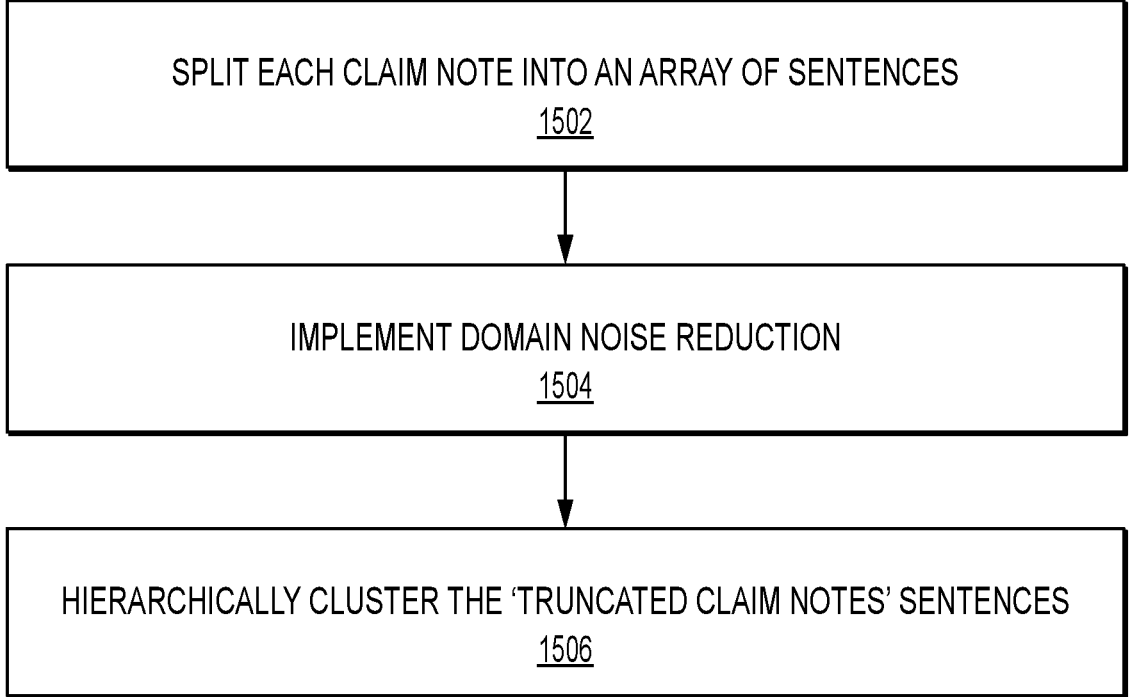
FIG. 15 illustrates an example process for creating and summarizing claim sentence clusters for efficient tagging of claims.

FIG. 15 illustrates an example process 1500 for creating and summarizing case file sentences into clusters for efficient tagging of claims. The process 1500 is illustrated through an example of insurance claim notes. In step 1502 process 1500 splits each claim note into an array of sentences. Process 1500 may use a sentence splitter (e.g., using a Python NLTK) as a base sentence splitter process to break down the claim note into sentences.

The base sentence splitting in step 1502 may be imperfect due to the case note not following proper English grammar. This may happen, for example, with insurance claim notes where the claims adjuster may use various shorthand notation, or insurance claim notes having typographical errors or punctuation errors. Similar errors also may occur with typed or handwritten notes read by a computing system using an optical character recognition (OCR) operation or other similar operations. Process 1500 may include a second, custom, sentence splitter process that acts on the sentences already split by the base sentence splitter process. The second sentence splitter process may employ a model that is pre-trained based on specific customer's data to recognize run-on sentences and sentence boundaries with missing punctuations. The model may use various techniques such as, inter alia: regular expressions, median sentence size, capitalization detection, SVM, and RNN to identify typical grammar errors in the customer's data and detect sentence boundaries. The sentence splitter may further break down the sentences split by the base sentence splitter process and convert them as ready for the next NLP pipeline stage.

In step 1504, process 1500 implements a domain noise reduction phase. FIG. 16 illustrates an example process 1600 for implementing a domain noise reduction phase. In step 1602, process 1600 may use a sentence embedding operation to convert sentences to a vector. Various techniques such as, inter alia: Word2Vec with aggregation, Doc2Vec, Glove, Google Universal Sentence Encoder, and TF-IDF may be used to convert a sentence to a vector.

In step 1604, based on the sentence embedding, process 1600 models (e.g., using a K-Means model) and then clusters the sentences into a specified number of clusters (e.g., hundreds of clusters)). In step 1606, for each cluster, process 1600 computes the number of sentences in the cluster, and the mean and standard deviation of the sentences from the cluster center. In step 1608, process 1600 applies a second layer of statistics and/or a machine learning classifier on top of the above cluster statistics to determine which are coherent clusters (e.g., clusters with low mean and low standard deviation of the sentences from the cluster center, where "low" is relative to the above statistics). The coherent clusters at this stage may be the domain noise clusters. The process may add an additional layer to compare these clusters against various boiler plate text templates extracted from other documents in the case files (e.g., medical reports in an insurance claim file) to further validate and identify "domain noise" clusters.

In step 1610, process 1600 discards the domain noise clusters and creates a "truncated claim note" for each claim that has the "domain noise" reduced/removed. Process 1600 may be implemented separately for each category of claim or case file (e.g., based online/type of business, coverage, etc.). One skilled in the art will appreciate that this technique may be extended to other examples and use cases beyond insurance claims processing; e.g., any text-analysis domain, such as understanding warranties, and processing user reviews from end users (e.g., Yelp), etc.

Returning to FIG. 15, step 1506, process 1500 may hierarchically cluster the "truncated claim notes" sentences generated in step 1610 of FIG. 16. FIG. 17 illustrates an example process 1700 for hierarchically clustering the "truncated claim notes" sentences. In step 1702, process 1700 may implement a sentence embedding of the truncated claim notes and repeat clustering. In step 1704, within each cluster, process 1700 may apply a different sentence embedding and sub-cluster the sentences within the cluster.

Various portions of steps 1702 and 1704 may be iteratively repeated until some pre-set goal is reached in step 1706 (e.g., a number of sub-clusters, number of sentences in each sub-cluster is reached). For example, a first use of a Universal Sentence Encoder (e.g., Google Universal Sentence Encoder, etc.) may be to convert the sentence into a vector and cluster the converted sentences into n-clusters (e.g., ten clusters). Within each cluster, process 1700 may cluster the sentences using a different embedding method such as TF-IDF. Process 1700 may be repeated until the pre-set goal is reached. Furthermore, this method of hierarchical clustering may use different features of the sentences at each stage of the hierarchy so as to provide a better clustering of the claim notes than might occur using a larger number of clusters with the same features.

Process 1700 may now have a set of sub-clusters with sentences from the claim notes without domain noise. In step 1708, based on cluster metrics (e.g., number of sentences in each sub-cluster, mean and standard deviation from cluster center, etc.), process 1700 may then classify each sub-cluster into one of the following categories (provided by way of example):

Coherent: the cluster has a mean and standard deviation of the distances from the cluster center that are both below configured or learned thresholds (e.g., mean <0.2, std <0.25). In other words, all the sentences in the cluster are semantically "very close" to each other.

Mostly Coherent: the cluster has a mean of the distances from the cluster center below a configured or learnt threshold, whereas the standard deviation is above the corresponding threshold (e.g., mean <0.2, std >0.25). In other words, most of the sentences in the cluster are semantically "very close" to each other, but there are a few outliers.

Ring: the cluster has a mean of the distances from the cluster center above a configured or learned threshold, whereas the standard deviation is below the corresponding threshold (e.g., mean >0.2, std <0.25). In other words, the cluster sentences form a ring around the cluster center (similar to Saturn's rings), with about four to seven distinct themes in the cluster.

Discordant: the cluster has a mean and standard deviation of distances from the cluster center that are both above a configured or learnt threshold. In other words, the clusters may have sentences that are spread out from the cluster center.

In step 1710, process 1700 may use text summarization techniques to summarize each cluster into a lesser number of sentences depending on the cluster type. For example, a coherent cluster may only need one sentence to summarize the entire cluster. The mostly coherent and ring clusters may be summarized into a few (e.g., five to seven (5-7) sentences). Discordant clusters may be summarized using a larger number of sentences. Summarized sentence clusters reduce the entire claim space (e.g., thousands of claims with hundreds of sentences each) into a few hundred sentences that capture the salient aspects of the insurance claim notes. This summarization process may make subsequent sentence tagging/annotation processes much more efficient.

Figure 18:
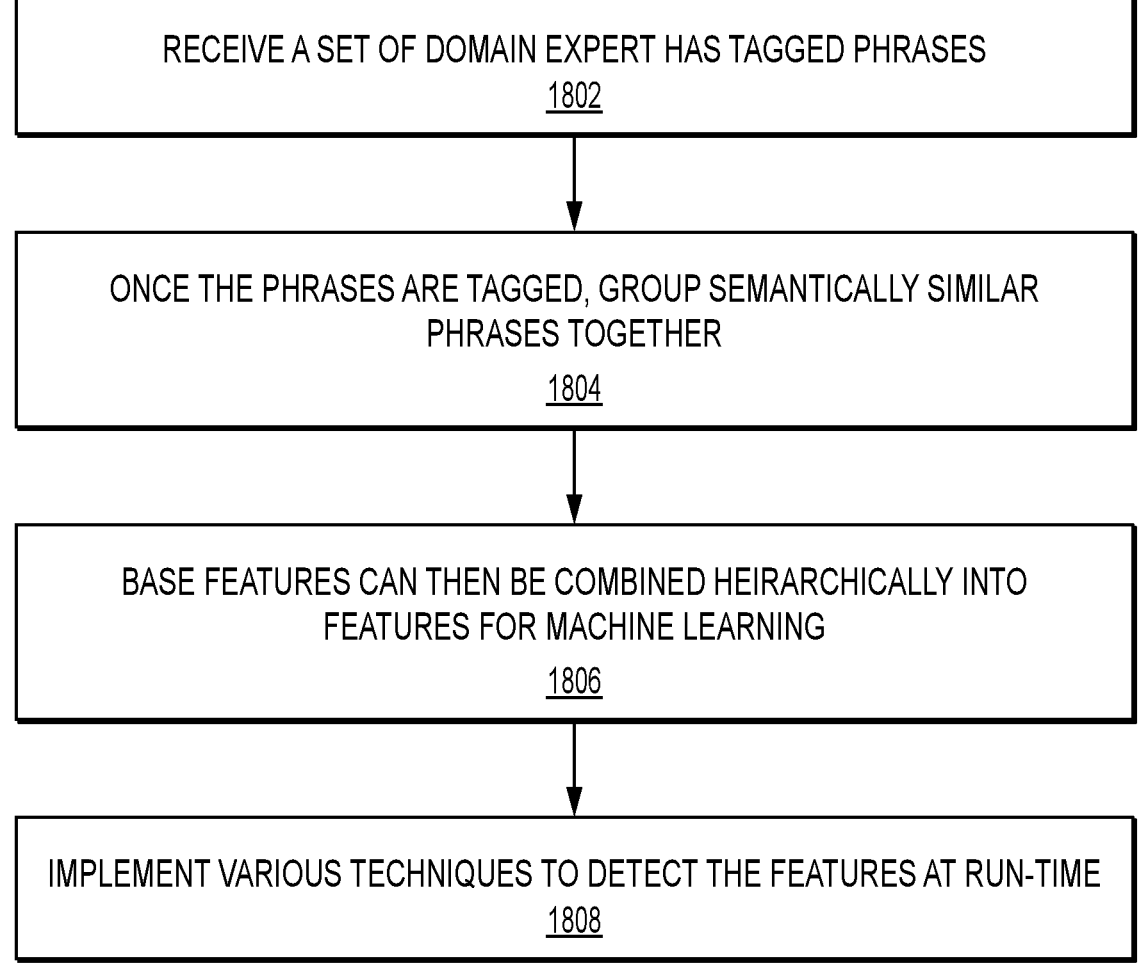
FIG. 18 illustrates an example process for detecting base features based on semantic intent of tags, and a hierarchical approach for combining the tagged features into insights.

FIG. 18 illustrates an example process 1800 for detecting base features and behavioral patterns found in the text based on a semantic intent of tags using a semantic analysis, and a hierarchical approach for combining tagged features into insights. In step 1802, process 1800 may receive a set of domain-expert-has-tagged phrases. Once the phrases are tagged, process 1800 may identify semantically similar phrases. For example, the phrase "he went to the ER" is different from "he did not go to the ER" or "he skipped the ER visit" or "if an ER visit happened". In another example, the phrase, "he went to the ER" is the same as "he went to the emergency room", "she went to the hospital", etc. When the domain expert adds a tag on "went to ER", process 1800 may differentiate between these cases and correctly flag claims as "went to ER". Process 1800 may detect phrases that are semantically similar or dissimilar to the tags. Note that claims adjusters may use their own short-hand notations and may not use proper English grammar when documenting insurance claims. There may be several instances of punctuation marks missing or typographical errors. This makes it more challenging to identify similar phrases. Features in the insurance claims domain can be, for example, behavioral patterns, which may be represented as a set of semantic tags.

In step 1804, process 1800 may once the phrases are tagged, group semantically similar phrases together. A connotation detector may be used to detect various connotations such as positive, negative, speculative, and other connotations. Semantically similar phrases with similar connotations then are grouped into base features.

In step 1806, process 1800 base features may then be combined hierarchically into features (e.g., behavioral patterns) for machine learning. These features may be either inserted as rules in an expert system or as inputs into machine learning classifiers. Reinforcement learning may be added for continuous improvements to the models.

In step 1808, the process 1800 may implement various techniques (such as, inter alia: sentence embedding, regular expressions, classifiers, and combinations thereof) to detect the features at run time.

Computerized Natural Language Processing with Insights Extraction Using Semantic Search FIGS. 19 and 20 illustrate an example process 1900 for implementing computerized natural language processing with insights extraction using semantic search. The example process 1900 is described with reference to the system 2200 of FIGS. 22A and 22B.

In step 1902, process 1900 breaks down a large chunk of unstructured text (e.g., a corpus of lengthy documents 2204, see FIG. 22A) into one or more sentences and/or short paragraphs (e.g., 3-5 sentences each), using a sentence splitter (e.g., sentence splitter 2206). Process 1900 may identify sentence boundaries when grammar rules are not followed.

In step 1904, process 1900 trains a domain noise classifier on the corpus of data using unsupervised learning techniques. In this step, process 1900 classifies each sentence as noise or non-noise using classification system 2208. Multiple domain noise classifiers may be trained and applied, based on the nature of the corpus. For example, a template text without an answer may be classified as noise.

In step 1906, a sentence-intent classifier is applied on the non-noise sentences to classify each sentence based on its intent (e.g., affirmative sentence, negation sentence, tentative sentence, conditional sentence, etc.). Step 1906 may generate categorized and tagged sentences 2210. The following examples are noted:

"Claimant threatens to seek attorney? N/A" may be classified as a noise sentence.

"Clmt threatens to seek atty" may be classified as an affirmative sentence.

"Claimant threatens to seek attorney? No" may be classified as a negation sentence.

"If Clmt threatens to seek attorney, settle fast" may be classified as a conditional sentence.

"Clmt upset, may seek attorney" may be classified as a tentative sentence.

In step 1908, each sentence is further tagged with domain relevant categories based on the various aspects of the text. For example, in the context of insurance claim notes, a sentence may be tagged with the line of business (e.g., "Auto", "Homeowners") and coverage (e.g., "Bodily Injury", "Property Damage"), applicable to the claim note.

In step 1910, the classified and tagged sentences are fed to a text search engine (e.g., Apache Solr, Elastic Search, etc.) which performs transformations such as stemming, lemmatization, etc. on the text and supports fuzzy searches. The process of step 1910 may be performed on text search database 2212.

In step 1912, process 1900 builds an ontology with a list of hashtags and the applicability of the hashtag to the various categories. For example:

SoftTissueInjury=>{LOBs: ("Auto", "General Liability"), Coverages: ("Bodily Injury", "Slip and Fall", . . . ), . . . }.

In step 1914, process 1900 builds a multitude of minidictionaries and links the mini-dictionaries to the categories based on relevance. Mini-dictionaries may be included in the ontology graph database 2202. These mini-dictionaries may further be auto-learned from the categorized sentences, using techniques (e.g., word2vec, Glove, etc.). Examples include:

{LOB: "Auto", Coverage: "Bodily Injury"}: strain=strain, sprain, twist.
{LOB: "Homeowners", Coverage: "Property Damage"}: strain=strain, fracture.
{LOB: "Auto", Coverage: "Emotional Injury"}: strain=strain, tiredness.

In step 1916, each hashtag is linked to a set of seed query phrases along with the sentence type they apply to. Examples include:

SoftTissueInjury:
{Affirmative Sentence}=>"soft tissue injury", "strain", "neck pain";
{Negation Sentence}=>"not serious injury".

In step 1918, process 1900 links each hashtag to a set of seed query phrases that negate the hashtag. Examples include:

SoftTissueInjury:
NOT {Accusatory Sentence}=>"pain in the neck"

In step 1920, process 1900 may in some cases, link other types of queries such as REGEX queries, etc. to the hashtag. Examples include:

SoftTissueInjury:
REGEX {Affirmative Sentence}=>/.*soft-tissue.*/

In step 1922, all of the above configurations and corresponding links are stored in an ontology graph database (e.g., a proprietary graph database and graph analytics software such as, inter alia: Neo4j®, TigerGraph®, SolrGraph®, etc.). This may be done for efficient access. The structure of the graph database provides an implicit rules hierarchy.

In step 1924, process 1900 builds a distributed multi-stage parallel-processing software pipeline that reads the above configuration and runs through a corpus of documents to identify sentences that match each hashtag. The hashtag operations may be performed by hashtag execution engine 2214. Module 2218 executes the various operations on the sentences and short paragraphs with hashtags, using a distributed, parallel processing engine.

In step 1926, the taggings from above pipeline then may be presented to a domain expert for validation using domain expert validation module 2216. The short paragraph each sentence belongs to may be presented to the domain expert for additional context. In step 1928, machine learning based classifiers may now be built on top of the sentences/short paragraphs that are extracted in a focused manner for each hashtag.

In production deployment, in step 1930, the machine learning classifiers may be added as a final stage to the above processing pipeline to automatically tag a chunk of text (e.g., claim notes) with a list of semantic hashtags, topics, and events; along with temporal information as to when the hashtag/topic/event was detected in the document. The tagged documents may be further used for trend analysis, pattern determination, predictive modeling, workflows, and other use cases.

Process 1900 may provide increased processing speed with the same pipeline-based accuracy. Process 1900 may provide more focused training and model tuning for each hashtag. Process 1900 may provide increased accuracy in identifying topics, events, etc. as a result of domain noise reduction, sentence intent understanding, and text snippet category aware tagging.

FIG. 21 illustrate another example process 2100 for implementing computerized natural language processing with insights extraction using semantic search. In step 2102, a sentence splitter splits a lengthy document into sentences and short paragraphs using domain specific grammar rules.

In step 2104, an unsupervised learning-based approach is used to classify the sentences and short paragraphs as noise/non-noise objects and then eliminate the domain noise objects.

In step 2106, a supervised learning-based approach is used to identify the "intent" of each non-noise sentence or short paragraph, from a pre-defined set of intents.

In step 2108, an automated mechanism is used to remove domain noise and tag each non-noise sentence with its intent and other domain-relevant categories.

In step 2110, process 2100 creates/provides an ontology graph database which comprises sentence classes (intents), domain-relevant categories, a multitude of mini-dictionaries, and hashtags with applicable categories and various types of queries.

In step 2112, process 2100 provides/manages a distributed parallel-processing, multi-stage hashtag execution engine that uses the ontology graph database to automatically tag each sentence with one or more domain-relevant semantic hashtags.

In step 2114, process 2100 provides a mechanism for a domain expert to label and train semantic topic classifiers based on the domain-relevant semantic hashtags.

In step 2116, process 2100 provides a topic execution engine that further classifies the hashtags to semantic topics and tags each original document in the corpus with a list of semantic temporal topics, that may be further used in trend analysis, pattern detection, predictive modeling, workflows, and other use cases.

Figure 22A:
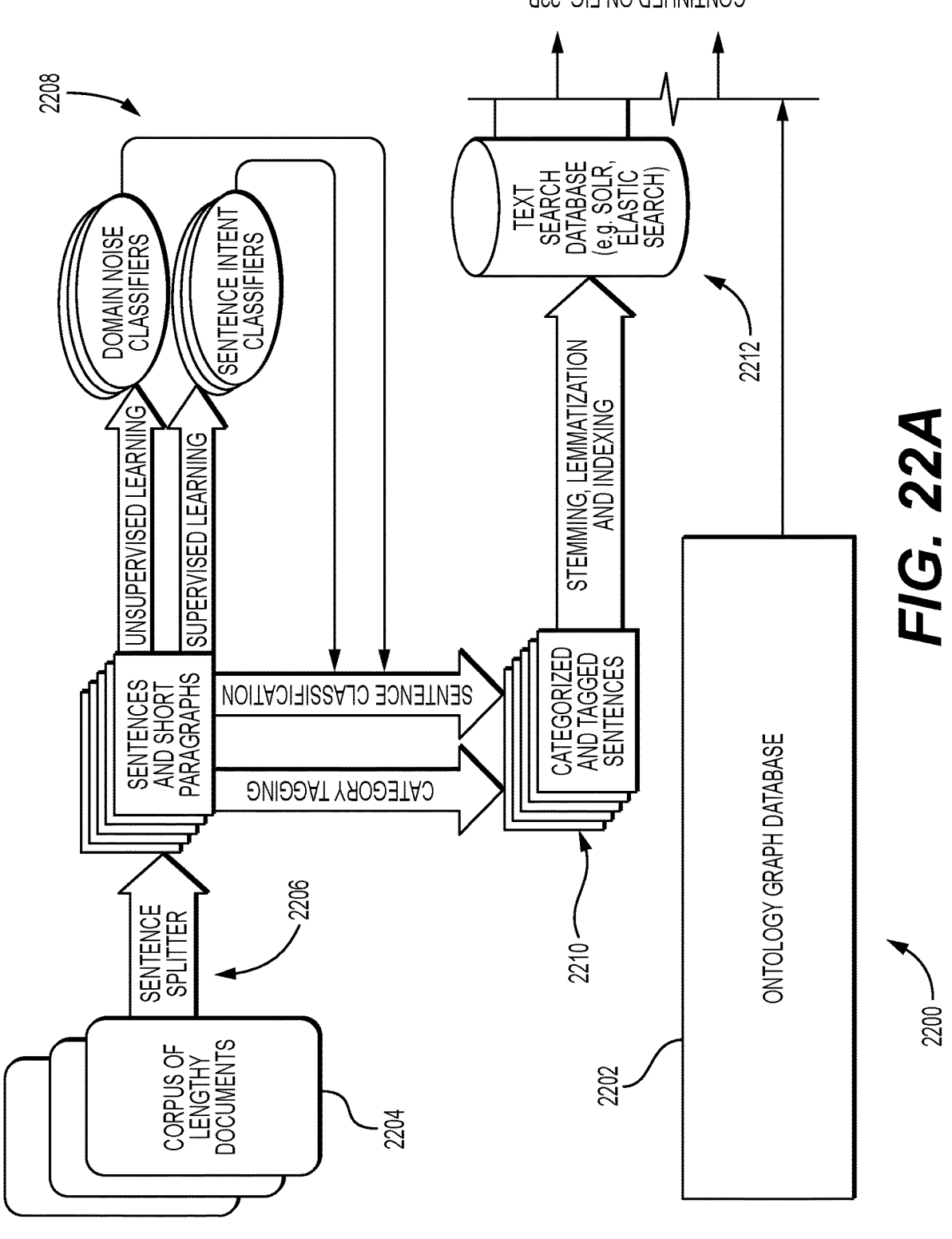
FIGS. 22A and 22B illustrate an example system for implementing a computerized natural language processing with insights extraction using semantic search.
Figure 22B:
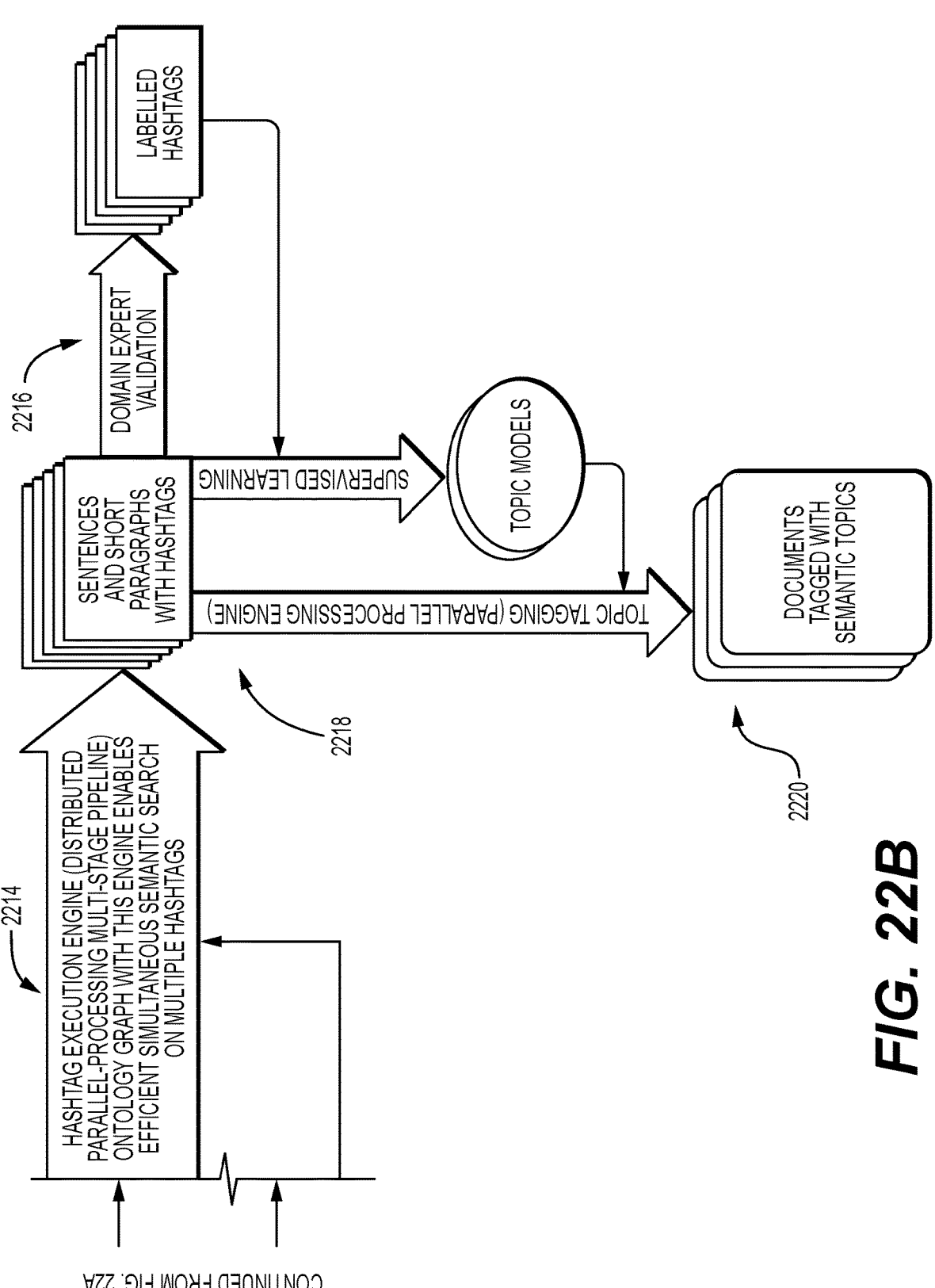

FIGS. 22A and 22B illustrate an example system 2200 for implementing computerized natural language processing with insights extraction using semantic search. System 2200 may be implemented in an apparatus and procedure to effectively extract hashtags representing semantic topics a corpus of documents, each having large chunks of text, wherein each semantic topic is or may be critical towards achieving an end goal, but may only be mentioned very briefly in each document. The description of system 2200 has been integrated into the discussion of process 1900 supra.

In one example, a corpus of lengthy documents 2204 may be operated upon by sentence splitter 2206 to create a set of sentences and short paragraphs. Machine learning process 2208 (e.g., unsupervised and supervised ML) may operate on the set of sentences and short paragraphs. For example unsupervised learning determines domain noise classifiers. Supervised learning determines sentence intent classifiers. These are provided to a sentence classification process that along with a category tagging process generates a set of categorized and tagged sentences 2210. Stemming, lemmatization and indexing operations are performed on the set of categorized and tagged sentences 2210 to generate text search database (e.g., Solr®, Elastic Search®, etc.) 2212. A hashtag execution engine 2214 (e.g., distributed parallel-processing multi-stage pipeline) and/or use of the ontology graph enables an efficient simultaneous semantic search on multiple hashtags to be performed. This semantic search may identify sentences and short paragraphs with hashtags 2218. Domain expert validation 2216 may be implemented on sentences and short paragraphs with hashtags 2218 to generate labelled hashtags to be utilized as part of another supervised learning process. The supervised learning process may generate various topic models. The topic models may be input (along with sentences and short paragraphs with hashtags 2218) into a topic tagging process (e.g., with a parallel processing engine) to generate documents tagged with semantic topics 2220.

Figure 23:
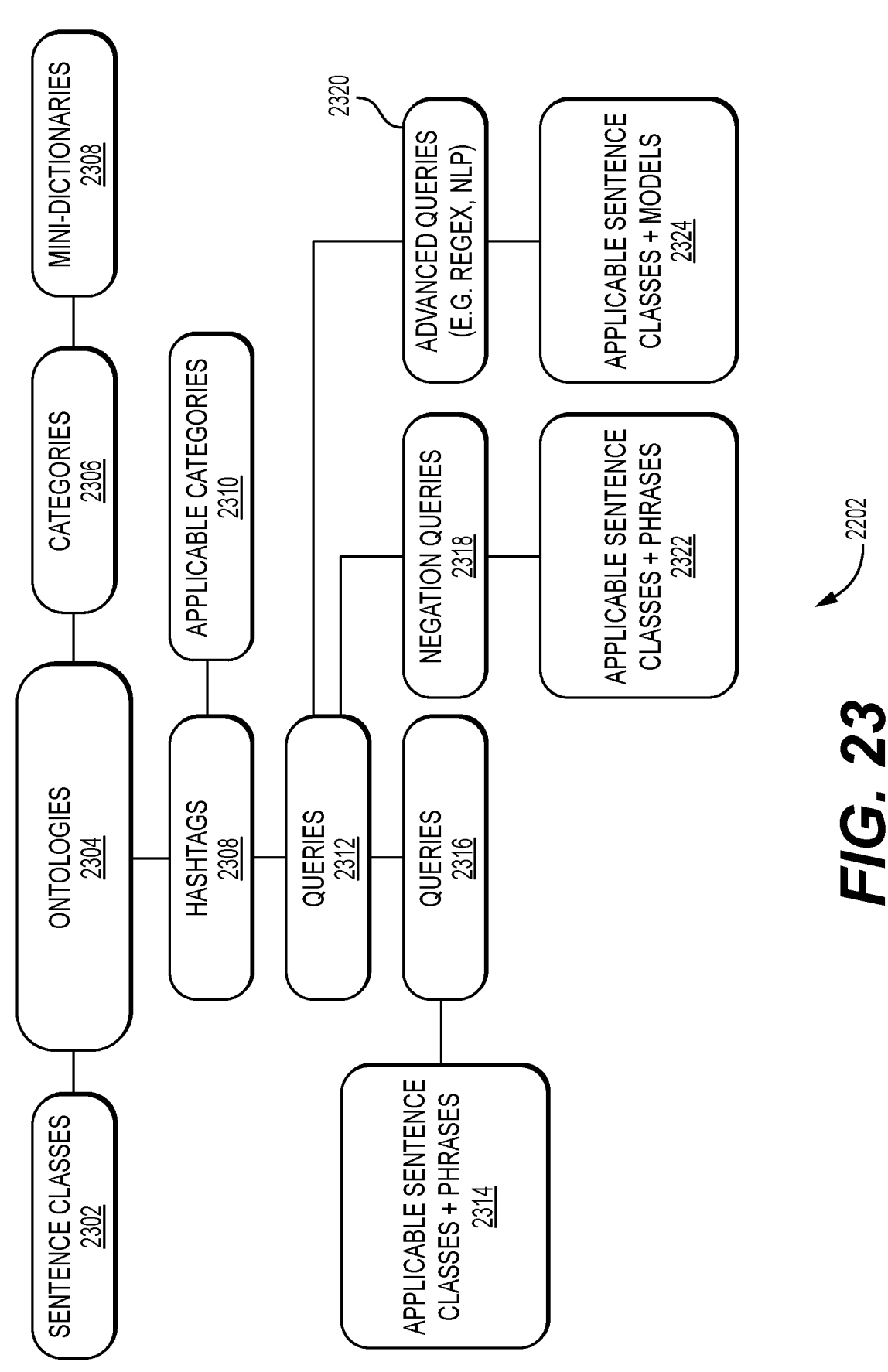
FIG. 23 illustrates an example ontology graph database.

FIG. 23 illustrates an example ontology graph database 2202. Ontology graph database 2202 includes, inter alia: ontologies 2304, categories 2306, mini-dictionaries 2308, hashtags 2308, applicable categories 2310, sentence classes 2302, queries 2312, negation queries 2318, advanced queries (e.g., regex, NLP) 2320 applicable sentence classes and phrases 2314, applicable sentence classes and phrases 2322, applicable sentence classes and models 2324, detection queries 2316, etc.

Additional Computer Architecture

FIG. 24 depicts an exemplary computing system 2400 that may be configured to perform any one of the processes disclosed herein. In this context, computing system 2400 may include, for example, a processor, memory, storage, and 1/0 devices (e.g., monitor, keyboard, disk drive, Internet connection, etc.). However, computing system 2400 may include circuitry or other specialized hardware for carrying out some or all aspects of the processes. In some operational settings, computing system 2400 may be configured as a system that includes one or more units, each of which is configured to carry out some aspects of the processes either in software, hardware, or some combination thereof. System 2400 may be implemented in a cloud-computing platform as well.

FIG. 24 depicts computing system 2400 with a number of components that may be used to perform any of the processes described herein. The main system 2402 includes a motherboard 2404 having an 1/0 section 2406, one or more central processing units (CPU) 2408, and a memory section 2410, which may have a flash memory card 2412 related to it. The 1/0 section 2406 may be connected to a display 2414, a keyboard and/or other user input (not shown), a disk storage unit 2416, and a media drive unit 2418. The media drive unit 2418 may read/write a non-transient, computer-readable storage medium 2420, which may contain programs 2422 and/or data. Computing system 2400 may include a web browser. Moreover, computing system 2400 may be configured to include additional systems in order to fulfill various functionalities. Computing system 2400 may communicate with other computing devices based on various computer communication protocols such a Wi-Fi, Bluetooth® (and/or other standards for exchanging data over short distances includes those using short-wavelength radio transmissions), USB, Ethernet, cellular, an ultrasonic local area communication protocol, etc.

Conclusion

Although the present examples have been described with reference to specific features, various modifications and changes may be made to these examples without departing from the broader spirit and scope of the various examples. For example, the various devices, modules, etc. described herein may be enabled and operated using hardware circuitry, firmware, software or any combination of hardware, firmware, and software (e.g., embodied in a machine-readable medium).

In addition, the various operations, processes, and methods disclosed herein may be embodied in a non-transitory machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

Certain devices or systems shown in the Figures include a computing system. The computing system includes a processor (CPU) and a system bus that couples various system components including a system memory such as read only memory (ROM) and random access memory (RAM), to the processor. Other system memory may be available for use as well. The computing system may include more than one processor or a group or cluster of computing system networked together to provide greater processing capability. The system bus may be any of several types of bus structures including a memory bus or memory controller, a peripheral bus, and a local bus using any of a variety of bus architectures. A basic input/output (BIOS) stored in the ROM or the like, may provide basic routines that help to transfer information between elements within the computing system, such as during start-up. The computing system further includes data stores, which maintain a database according to known database management systems. The data stores may be embodied in many forms, such as a hard disk drive, a magnetic disk drive, an optical disk drive, tape drive, or another type of computer readable media which can store data that are accessible by the processor, such as magnetic cassettes, flash memory cards, digital versatile disks, cartridges, random access memories (RAM) and, read only memory (ROM). The data stores may be connected to the system bus by a drive interface. The data stores provide nonvolatile storage of computer readable instructions, data structures, program modules and other data for the computing system.

To enable human (and in some instances, machine) user interaction, the computing system may include an input device, such as a microphone for speech and audio, a touch sensitive screen for gesture or graphical input, keyboard, mouse, motion input, and so forth. An output device can include one or more of a number of output mechanisms. In some instances, multimodal systems enable a user to provide multiple types of input to communicate with the computing system. A communications interface generally enables the computing device system to communicate with one or more other computing devices using various communication and network protocols.

The preceding disclosure refers to flowcharts and accompanying descriptions to illustrate the example processes disclosed herein. The disclosed devices, components, and systems contemplate using or implementing any suitable technique for performing the steps illustrated. Thus, flowcharts are for illustration purposes only and the described or similar steps may be performed at any appropriate time, including concurrently, individually, or in combination. In addition, many of the steps in the flowcharts may take place simultaneously and/or in different orders than as shown and described. Moreover, the disclosed systems may use processes and methods with additional, fewer, and/or different steps.

Examples disclosed herein can be implemented in digital electronic circuitry, or in computer software, firmware, or hardware, including the herein disclosed structures and their equivalents. Some examples can be implemented as one or more computer programs, i.e., one or more modules of computer program instructions, encoded on computer storage medium for execution by one or more processors. A computer storage medium can be, or can be included in, a computer-readable storage device, a computer-readable storage substrate, or a random or serial access memory. The computer storage medium can also be, or can be included in, one or more separate physical components or media such as multiple CDs, disks, or other storage devices. The computer readable storage medium does not include a transitory signal.

We claim:

1. A system for efficient topic extraction, and corresponding semantic tagging, from a corpus of documents related to a domain of interest, a document comprising text data objects, each extracted topic relevant to achieving a goal of a domain-specific entity, the system, comprising:

one or more processors;

one or more human-user interfaces; and a non-transitory, computer-readable storage medium having encoded thereon, machine instructions that when executed, cause the one or more processors to:

execute a routine to split a domain-specific document into data objects, the data objects comprising sentences and paragraphs, using grammar rules specific to the domain-specific entity, apply an unsupervised learning model to classify the data objects as one of noisy data objects and non-noisy data objects for the domain-specific entity, discard the noisy data objects, apply a supervised learning model to identify, based on a pre-defined set of intents, an intent of each non-noisy data object, tag each non-noisy data object with its identified intent, apply the identified intent to an ontology graph database to identify a corresponding semantic hashtag, annotate each non-noisy data object with its corresponding semantic hashtag, and using one or more semantic hashtag-annotated non-noisy data objects, generate, for the domain-specific entity, one or more recommended actions for achieving the goal.

2. The system of claim 1, wherein the processor further executes the machine instructions to:

generate a score and a priority for each of the one or more recommended actions, and append the score and the priority to each of the one or more recommended actions.

3. The system of claim 2, wherein the processor identifies actions already completed towards achieving the goal, and wherein the processor provides prioritized non-completed actions as the recommended actions.

4. The system of claim 2, wherein the processor determines a weighting factor to apply to each recommended action, wherein the processor computes the score by applying the weighting factor to each recommended action.

5. The system of claim 1, wherein the actions are queries to ask and have answered.

6. The system of claim 1, wherein the ontology graph database comprises sentence classes (intents), domain-relevant categories, a plurality of mini-dictionaries, hashtags with applicable categories, and a plurality of action types.

7. The system of claim 1, further comprising the processor using a distributed parallel-processing multi-stage hashtag execution engine that applies the ontology graph database to automatically tag each sentence with one or more domain-relevant semantic hashtags.

8. The system of claim 1, further comprising the processor receiving domain-expert provided labels for use in labeling and training semantic topic classifiers based on the hashtags.

9. The system of claim 1, wherein the processor executes a topic extractor that further classifies the hashtags to semantic topics and tags each original document in the corpus with a list of semantic temporal topics.

10. The system of claim 9, wherein the topic extractor is configured to be applied by large language models and machine learning models to reduce CPU time and memory allocation requirements.

11. A computer-implemented method for extracting semantic hashtags representing topics at least implicit in one or more domain-specific documents, each topic relevant to achieving a goal of a domain-specific entity, the method comprising:

a processor executing a routine to split a domain-specific document into data objects, the data objects comprising sentences and paragraphs, using grammar rules specific to the domain-specific entity;

applying an unsupervised learning model to classify the data objects as one of noisy data objects and non-noisy data objects for the domain-specific entity;

discarding the noisy data objects;

applying a supervised learning model to identify, based on a pre-defined set of intents, an intent of each non-noisy data object;

tagging each non-noisy data object with its identified intent;

applying the identified intent to an ontology graph database to identify a corresponding semantic hashtag;

annotating each non-noisy data object with its corresponding semantic hashtag; and using one or more semantic hashtag-annotated non-noisy data objects, generating, for the domain-specific entity, a recommended action for achieving the goal.

12. The method of claim 11, wherein the ontology graph database comprises sentence intents, domain-relevant categories, a plurality of mini-dictionaries, hashtags with applicable categories, and a plurality of action types.

13. The method of claim 11, further comprising using a distributed parallel-processing multi-stage hashtag execution engine to apply the ontology graph database to automatically tag each sentence with one or more domain-relevant semantic hashtags.

14. The method of claim 11, further comprising the processor receiving domain-expert provided labels for use in labeling and training semantic topic classifiers based on the hashtags.

15. The method of claim 11, wherein the processor executes a topic extractor that further classifies the hashtags to semantic topics and tags each original document in a corpus of documents with a list of semantic temporal topics.

16. The method of claim 15, wherein the topic extractor is configured to be applied by large language models and machine learning models to reduce CPU time and memory allocation requirements.

17. A natural language processing system, comprising:

a distributed, parallel processing system comprising one or more processors;

a man-machine interface configured to receive inputs from, and provide outputs to, human users; and non-transitory, computer-readable storage media having encoded thereon, machine instructions for implementing natural language processing with insights extraction using semantic search, wherein a processor executes the machine instructions to:

access a digitized version of a document received through the man-machine interface, identify a domain of interest based on the document, apply a document parser, specific to the domain of interest, to the document, comprising:

break down the document into data chunks;

break down the data chunks into data objects, the data objects including sentences and paragraphs, using domain-specific sentence structures and boundaries, and domain-specific grammar rules; and apply a trained, domain specific noise classifier to identify noisy data objects and non-noisy data objects and discard the noisy data objects, apply a data object intent classifier to the non-noisy data objects to identify intents of the data objects, apply the intents to an ontology database to identify semantics, use the semantics to identify actions for completion, determine actions already completed, prioritize and score actions not completed, and provide a list of actions to complete based on a prioritized score.

18. The natural language processing system of claim 17, further comprising the processor scoring and prioritizing an action based on a natural language processor determining a severity of the action, wherein a severity analysis includes determination of one or more of financial cost and risk of litigation.

19. A computer-implemented method for achieving a goal of an end user, comprising:

receiving a document provided by the end user, the document comprising unstructured data related to a domain of interest;

processing the unstructured data to identify the domain of interest and a corresponding scenario and context, comprising:

using domain-specific sentence structure and boundary rules, and domain-specific grammar rules, parsing the unstructured data to identify data objects in the document, the data objects comprising words and phrases, applying a trained, domain-specific noise classifier to identify noisy data objects and non-noisy data objects and discard the noisy data objects, and processing the non-noisy data objects, using a natural language processor, to identify a scenario and a context of the document;

using expert configured and learned data objects relevant to the scenario and the context, searching the non-noisy data objects from the document to identify actions relevant to achieving the end user goal;

applying a rules engine to determine non-completed actions from actions identified as relevant to achieving the end user goal;

generating a non-completed actions list for actions determined as non-completed;

identifying, based on the scenario and the context, a domain-specific severity associated with each non-completed action;

scoring and prioritizing each non-completed action based on the severity, wherein a non-completed action with a highest severity is assigned a highest score and priority; and presenting to the end user, a recommended list of next actions to complete comprising one or more of the non-completed actions arranged in order of highest priority to lowest priority.

20. The computer-implemented method of claim 19, wherein severity is determined by natural language processing of completed and non-completed actions, and wherein a severity of one or more non-completed actions is based on a severity analysis of one or more completed actions.

21. The computer-implemented method of claim 20, comprising repeating the scoring and prioritizing after completion of each non-complete action.

* * * * *